United States Patent
Jotoku et al.

(10) Patent No.: US 11,634,804 B2
(45) Date of Patent: Apr. 25, 2023

(54) AUSTENITIC STAINLESS STEEL WELD JOINT

(71) Applicant: NIPPON STEEL CORPORATION, Tokyo (JP)

(72) Inventors: Kana Jotoku, Tokyo (JP); Kenta Yamada, Tokyo (JP); Hirokazu Okada, Tokyo (JP); Takahiro Osuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/975,444

(22) PCT Filed: Feb. 28, 2019

(86) PCT No.: PCT/JP2019/007930
§ 371 (c)(1),
(2) Date: Aug. 25, 2020

(87) PCT Pub. No.: WO2019/168119
PCT Pub. Date: Sep. 6, 2019

(65) Prior Publication Data
US 2020/0392611 A1    Dec. 17, 2020

(30) Foreign Application Priority Data
Feb. 28, 2018 (JP) .............................. JP2018-035942

(51) Int. Cl.
*C22C 38/58* (2006.01)
*C22C 38/00* (2006.01)
(Continued)

(52) U.S. Cl.
CPC ............ *C22C 38/58* (2013.01); *C22C 38/001* (2013.01); *C22C 38/002* (2013.01); *C22C 38/02* (2013.01);
(Continued)

(58) Field of Classification Search
None
See application file for complete search history.

(56) References Cited

U.S. PATENT DOCUMENTS

| | | | |
|---|---|---|---|
| 4,443,406 A * | 4/1984 | Sukekawa ......... | B23K 35/3066 |
| | | | 219/146.23 |
| 2009/0196783 A1 | 8/2009 | Osuki et al. | |
| 2010/0054983 A1 | 3/2010 | Osuki et al. | |
| 2010/0136361 A1 * | 6/2010 | Osuki ................. | B23K 35/304 |
| | | | 428/576 |

(Continued)

FOREIGN PATENT DOCUMENTS

| CA | 3032772 A1 | 2/2018 |
|---|---|---|
| CN | 101495662 A | 7/2009 |

(Continued)

OTHER PUBLICATIONS

Machine translation JP 2001107196 A from Espacenet (translated Sep. 10, 2021) (Year: 2001).*

*Primary Examiner* — Elizabeth Collister
(74) *Attorney, Agent, or Firm* — Greer, Burns & Crain, Ltd.

(57) ABSTRACT

Provided is an austenitic stainless steel weld joint that is excellent in polythionic acid SCC resistance and naphthenic acid corrosion resistance, and is also excellent in creep ductility. An austenitic stainless steel weld joint includes a base material and a weld metal. The weld metal has a chemical composition at its width-center position and at its thickness-center position consisting of, in mass %, C: 0.050% or less, Si: 0.01 to 1.00%, Mn: 0.01 to 3.00%, P: 0.030% or less, S: 0.015% or less, Cr: 15.0 to 25.0%, Ni: 20.0 to 70.0%, Mo: 1.30 to 10.00%, Nb: 0.05 to 3.00%, N: 0.150% or less, and B: 0.0050% or less, with the balance: Fe and impurities.

8 Claims, 4 Drawing Sheets

(51) Int. Cl.
  *C22C 38/02* (2006.01)
  *C22C 38/06* (2006.01)
  *C22C 38/42* (2006.01)
  *C22C 38/44* (2006.01)
  *C22C 38/46* (2006.01)
  *C22C 38/48* (2006.01)
  *C22C 38/52* (2006.01)
  *C22C 38/54* (2006.01)
  *F16B 5/08* (2006.01)

(52) U.S. Cl.
  CPC .............. *C22C 38/06* (2013.01); *C22C 38/42* (2013.01); *C22C 38/44* (2013.01); *C22C 38/46* (2013.01); *C22C 38/48* (2013.01); *C22C 38/52* (2013.01); *C22C 38/54* (2013.01); *F16B 5/08* (2013.01)

(56) References Cited

U.S. PATENT DOCUMENTS

2012/0003116 A1* 1/2012 Osuki ............... C22C 38/44
                                                              420/53
2014/0286698 A1* 9/2014 Osuki ............... C22C 38/58
                                                              403/271
2019/0144981 A1    5/2019 Seto et al.

FOREIGN PATENT DOCUMENTS

| JP | 2001107196 A | * | 4/2001 |
| JP | 2003166039 A | | 6/2003 |
| JP | 2017202493 A | | 11/2017 |
| WO | 2009044802 A1 | | 4/2009 |
| WO | 2017175839 A1 | | 10/2017 |

* cited by examiner 10  20  10

10  20  10

10

10

AUSTENITIC STAINLESS STEEL WELD JOINT

This is a National Phase Application filed under 35 U.S.C. § 371, of International Application No. PCT/JP2019/007930, filed Feb. 28, 2019, the contents of which are incorporated by reference.

TECHNICAL FIELD

The present invention relates to a weld joint, more specifically to an austenitic stainless steel weld joint.

BACKGROUND ART

An austenitic stainless steel weld joint is produced by welding austenitic stainless steel materials and includes a base material made of austenitic stainless steel and a weld metal. Austenitic stainless steel weld joints are used in welded structures of chemical plant facilities such as a thermal power boiler, an oil refining plant, and a petrochemical plant. Examples of the welded structures of the chemical plant facilities include peripheral equipment such as a distillation column, reheating furnace tubes, reaction tubes, heat exchangers, piping, and the like. Some components for the welded structures of the chemical plant facilities are used under an environment of which a temperature is as high as 600 to 700° C. and that includes a corrosive fluid containing sulfide and/or chloride. The environment being one of which a temperature is as high as 600 to 700° C. and that includes the corrosive fluid containing sulfide and/or chloride will be herein referred to as a "high-temperature corrosive environment."

Welded structures used in the high-temperature corrosive environment are caused to stop operating in a regular inspection of their chemical plant. While stopping operating, the welded structures decrease their temperatures to normal temperature. At this time, air, moisture, and sulfide scale react to form polythionic acid on surfaces of components of the welded structures. The polythionic acid induces stress corrosion cracking in a grain boundary (hereafter, referred to as polythionic acid SCC). Accordingly, components used in the high-temperature corrosive environment described above are required to have an excellent polythionic acid SCC resistance.

A steel with an increased polythionic acid SCC resistance is proposed in Japanese Patent Application Publication No. 2003-166039 (Patent Literature 1) and International Application Publication No. WO2009/044802 (Patent Literature 2). The polythionic acid SCC occurs due to Cr precipitating in a form of an $M_{23}C_6$ carbide in a grain boundary and a resultant Cr depleted zone formed in the proximity of the grain boundary. Therefore, according to Patent Literature 1 and Patent Literature 2, the polythionic acid SCC resistance is increased by reducing an amount of C to inhibit the formation of the $M_{23}C_6$ carbide.

Specifically, an heat resistant austenitic steel disclosed in Patent Literature 1 contains, in mass %, C: 0.005 to less than 0.03%, Si: 0.05 to 0.4%, Mn: 0.5 to 2%, P: 0.01 to 0.04%, S: 0.0005 to 0.005%, Cr: 18 to 20%, Ni: 7 to 11%, Nb: 0.2 to 0.5%, V: 0.2 to 0.5%, Cu: 2 to 4%, N: 0.10 to 0.30%, and B: 0.0005 to 0.0080%, with the balance being Fe and unavoidable impurities. A total of contents of Nb and V is 0.6% or more, and a solubility of Nb in the steel is 0.15% or more. In addition, $N/14 \geq Nb/93+V/51$ and $Cr-16C-0.5Nb-V \geq 17.5$ are satisfied. In Patent Literature 1, the polythionic acid SCC resistance is increased by reducing the amount of C and regulating a relation between Cr, and C, Nb, and V.

An austenitic stainless steel disclosed in Patent Literature 2 contains in mass %, C: less than 0.04%, Si: 1.5% or less, Mn: 2% or less, Cr: 15 to 25%, Ni: 6 to 30%, N: 0.02 to 0.35%, and Sol. Al: 0.03% or less, and further contains one or more elements selected from the group consisting of Nb: 0.5% or less, Ti: 0.4% or less, V: 0.4% or less, Ta: 0.2% or less, Hf: 0.2% or less, and Zr: 0.2% or less, with the balance being Fe and impurities. The impurities include P: 0.04% or less, S: 0.03% or less, Sn: 0.1% or less, As: 0.01% or less, Zn 0.01% or less, Pb: 0.01% or less, and Sb: 0.01% or less. In addition, $F1=S+\{(P+Sn)/2\}+\{(As+Zn+Pb+Sb)/5\} \leq 0.075$ and $0.05 \leq Nb+Ta+Zr+Hf+2Ti+(V/10) \leq 1.7-9 \times F1$ are satisfied. In Patent Literature 2, the polythionic acid SCC resistance is increased by setting the amount of C at less than 0.05%. In addition, grain boundary embrittling elements in the steel such as P, S, and Sn are reduced by reducing C immobilizing elements such as Nb and Ti, thereby enhancing embrittlement cracking resistance in a weld heat affected zone (HAZ).

CITATION LIST

Patent Literature

Patent Literature 1: Japanese Patent Application Publication No. 2003-166039

Patent Literature 2: International Application Publication No. WO2009/044802

SUMMARY OF INVENTION

Technical Problem

Now, in a case where crude oil of an inferior grade is used in chemical plant facilities, not only polythionic acid SCC corrosion but also naphthenic acid corrosion can occur. Naphthenic acid is a cycloalkane with one or more carboxyl groups. Unlike polythionic acid, the naphthenic acid causes general corrosion rather than SCC. Therefore, a weld joint used for the plant facilities described above is preferably excellent not only in polythionic acid SCC resistance but also in naphthenic acid corrosion resistance.

In addition, components used in the high-temperature corrosive environment at 600 to 700° C. have recently been requested to have high creep ductilities. As described above, a chemical plant facility may undergo a regular inspection with its equipment deactivated. The regular inspection involves examination of what components of welded structures of the chemical plant facility are in need of replacement. A high creep ductility allows checking how much a component deforms to be used as a criterion for replacing the component in the regular inspection.

Patent Literature 1 and Patent Literature 2 aim at improving the polythionic acid SCC resistance but have no study about naphthenic acid corrosion resistance and no study about enhancing the creep ductility. Moreover. Patent Literature 1 and Patent Literature 2 have no study about polythionic acid SCC resistance and naphthenic acid corrosion resistance of a weld joint that includes not only a base material but also a weld metal.

An objective of the present disclosure is to provide an austenitic stainless steel weld joint that is excellent in the polythionic acid SCC resistance and the naphthenic acid corrosion resistance, and is also excellent in the creep ductility of its base material.

Solution to Problem

An austenitic stainless steel weld joint according to the present disclosure includes a base material and a weld metal, wherein
a chemical composition of the base material consists of, in mass %:
C: 0.030% or less;
Si: 0.10 to 1.00%;
Mn: 0.20 to 2.00%;
P: 0.040% or less;
S: 0.010% or less;
Cr: 16.0 to 25.0%;
Ni: 10.0 to 30.0%;
Mo: 0.10 to 5.00%;
Nb: 0.20 to 1.00%;
N: 0.050 to 0.300%;
sol. Al: 0.001 to 0.100%;
B: 0.0010 to 0.0080%;
Cu: 0 to 5.00%;
W: 0 to 5.0%;
Co: 0 to 1.0%;
V: 0 to 1.00%;
Ta: 0 to 0.20%;
Hf: 0 to 0.20%;
Ca: 0 to 0.010%;
Mg: 0 to 0.010%; and
rare earth metals: 0 to 0.100%,
with the balance being Fe and impurities, and satisfying Formula (1), and
in the weld metal, at a width-center position and at a thickness-center position, a chemical composition of the weld metal consists of in mass %:
C: 0.050% or less;
Si: 0.01 to 1.00%;
Mn: 0.01 to 3.00;
P: 0.030% or less;
S: 0.015% or less;
Cr: 15.0 to 25.0%;
Ni: 20.0 to 70.0%;
Mo: 1.30 to 10.00%;
Nb: 0.05 to 3.00%;
N: 0.150% or less;
B: 0.0050% or less;
sol. Al: 0 to 1.000%;
Cu: 0 to 2.50%;
W: 0 to 1.0%;
Co: 0 to 15.0%;
V: 0 to 0.10%;
Ti: 0 to 0.50%;
Ta: 0 to 0.20%;
Ca: 0 to 0.010%;
Mg: 0 to 0.010%: and
rare earth metals: 0 to 0.100%,
with the balance being Fe and impurities:

$$B + 0.004 - 0.9C + 0.017 Mo^2 \geq 0 \quad (1)$$

where symbols of elements in Formula (1) are to be substituted by contents of corresponding elements (in mass %).

Advantageous Effect of Invention

The austenitic stainless steel weld joint according to the present disclosure is excellent in the polythionic acid SCC resistance and the naphthenic acid corrosion resistance, and is also excellent in the creep ductility of its base material.

DESCRIPTION OF EMBODIMENTS

Figure 1:
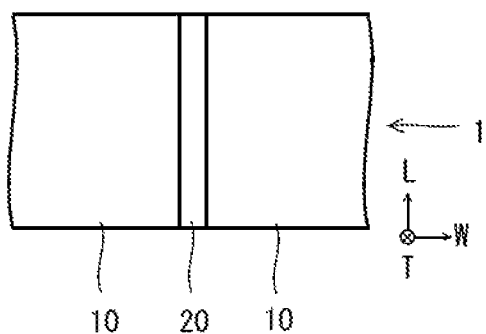
FIG. 1 is a plan view illustrating an example of an austenitic stainless steel weld joint according to the present embodiment.

The present inventors conducted studies on a weld joint that is excellent not only in the polythionic acid SCC resistance but also in the naphthenic acid corrosion resistance, and is also excellent in the creep ductility of its base material.

When a content of C in the base material is reduced to 0.030% or less, the formation of $M_{23}C_6$ carbide in use under a high-temperature corrosive environment is inhibited, and the formation of a Cr depleted zone in the proximity of a grain boundary is inhibited. Furthermore, in the base material of the austenitic stainless steel weld joint according to the present embodiment, 0.20 to 1.00% of Nb is contained to immobilize C with Nb, so as to further reduce an amount of dissolved C, which causes the formation of $M_{23}C_6$ carbide. In addition, the base material of the austenitic stainless steel weld joint according to the present embodiment contain Mo at 0.10 to 5.00%. Mo inhibits formation of the $M_{23}C_6$ carbide. Therefore, the formation of the Cr depleted zone is reduced. With the measures described above, the polythionic acid SCC resistance, a kind of stress corrosion cracking, can be increased.

In addition, against the naphthenic acid corrosion, the containing of Mo described above is effective. Against general corrosion such as sulfuric acid corrosion, making the base material contain Cu is effective. However, as described above, the naphthenic acid is a cycloalkane with a carboxyl group, and thus the naphthenic acid corrosion resistance is not increased even when Cu is contained. In contrast. Mo is very effective against the naphthenic acid corrosion. When an austenitic stainless steel weld joint is used in a high-temperature corrosive environment, Mo binds with S in the high-temperature corrosive environment to form a sulfide film on a surface of the austenitic stainless steel weld joint. This sulfide film increases the naphthenic acid corrosion resistance. Therefore, in the chemical composition of the base material, by setting a content of C at 0.030% or less, a content of Nb at 0.20 to 1.00%, and a content of Mo at 0.10 to 5.00%, not only the polythionic acid SCC resistance but also the naphthenic acid corrosion resistance are increased.

However, investigations conducted by the present inventors showed that reducing the content of C in the base material to 0.030% or less leads to a decrease in the creep ductility of the base material in a high-temperature corrosive environment at 600 to 700° C. The reason is considered as follows. Precipitates produced in grain boundaries increase grain boundary strength. With an increase in the grain boundary strength, the creep ductility of the base material is increased. However, if the content of C is reduced to 0.030% or less, the precipitates (carbide, or the like) produced in the grain boundaries are also reduced. As a result, a grain boundary strength is less likely to be obtained, which results in the decrease in the creep ductility of the base material.

Hence, the present inventors conducted further studies about an austenitic stainless steel weld joint which has an excellent polythionic acid SCC resistance, an excellent naphthenic acid corrosion resistance, and an excellent creep ductility of its base material at the same time. The present inventors paid attention to B (boron) as an element to be contained in the base material. The present inventors considered that B (boron) is able to increase the grain boundary strength through segregating in crystal grain boundaries under the high-temperature corrosive environment at 600 to 700° C. described above.

As a result of further studies, the present inventors considered that not only the excellent polythionic acid SCC resistance and the excellent naphthenic acid corrosion resistance but also an excellent creep ductility can be obtained when a chemical composition of a base material of an austenitic stainless steel weld joint consists of, in mass %, C: 0.030% or less, Si: 0.10 to 1.00%, Mn: 0.20 to 2.00%, P: 0.040% or less, S: 0.010% or less, Cr: 16.0 to 25.0%, Ni: 10.0 to 30.0%, Mo: 0.10 to 5.00%, Nb: 0.20 to 1.00%, N: 0.050 to 0.300%, sol. Al: 0.001 to 0.100%, B: 0.0010 to 0.0080%. Cu: 0 to 5.00%, W: 0 to 5.0%, Co: 0 to 1.0%, V: 0 to 1.00% Ta: 0 to 0.20%, Hf: 0 to 0.20%, Ca: 0 to 0.010%. Mg: 0 to 0.010%, and rare earth metals: 0 to 0.100%, with the balance being Fe and impurities.

However, results of investigations into polythionic acid SCC resistance and naphthenic acid corrosion resistance, and creep ductility of the base material of the austenitic stainless steel weld joint of which the base material have the chemical composition described above showed that the excellent creep ductility of the base material could not always be obtained, although the excellent polythionic acid SCC resistance and the naphthenic acid corrosion resistance could be obtained. The present inventors thus conducted further studies. As a result, it was found that a possible mechanism of the creep ductility of the base material is as follows.

As described above, the present embodiment involves both setting the content of C at 0.030% or less to increase the polythionic acid SCC resistance and the naphthenic acid corrosion resistance, and making 0.20 to 1.00% of Nb contained to immobilize C on Nb, so as to reduce the dissolved C. Specifically, Nb combines with C through solution treatment or short-time aging, precipitating in a form of MX carbo-nitride. However, the austenitic stainless steel weld joint according to the present embodiment is used in a high-temperature corrosive environment (corrosive environment at 600 to 700° C.) for a long time (at least 3000 hours or more). However, in such an environment, the MX carbo-nitride is of a metastable phase. Therefore, when the base material having the chemical composition described above is used in the high-temperature corrosive environment at 600 to 700° C. for a long-time, an MX carbo-nitride of Nb transforms into a Z phase (CrNbN), a stable phase, and an $M_{23}C_6$ carbide. B segregating in grain boundaries is replaced with C being part of the $M_{23}C_6$ carbide, so as to be absorbed into the $M_{23}C_6$ carbide. Therefore, an amount of B segregating in the grain boundaries is reduced, resulting in a decrease in the grain boundary strength. Consequently, obtaining a sufficient creep ductility fails.

Thus, the present inventors conducted further studies on a method for restricting the reduction in the amount of segregating B in grain boundaries in a use of an austenitic stainless steel weld joint under the high-temperature corrosive environment at 600 to 700° C. for a long time. As a result, it was found that the following mechanism can be conceived.

As described above, Mo restricts the formation of the $M_{23}C_6$ carbide itself. In addition, Mo may be replaced with M being part of $M_{23}C_6$ carbide, being dissolved into the $M_{23}C_6$ carbide. The $M_2C_6$ carbide with Mo dissolved therein is defined herein as "Mo-dissolved $M_{23}C_6$ carbide". The Mo-dissolved $M_{23}C_6$ carbide resists allowing B to be dissolved therein. Therefore, even when the MX carbo-nitride containing Nb transforms into the Z phase and the $M_{23}C_6$ carbide and the austenitic stainless steel weld joint is in use under the high-temperature corrosive environment, it is possible to restrict the dissolution of B into the $M_{23}C_6$ carbide and restrict the reduction in the amount of segregating B in grain boundaries, as long as the $M_{23}C_6$ carbide is an Mo-dissolved $M_{23}C_6$ carbide. It is considered that the excellent polythionic acid SCC resistance, the excellent naphthenic acid corrosion resistance, and the excellent creep ductility can be consequently obtained.

Hence, for the austenitic stainless steel weld joint that includes the base material having the chemical composition described above, the present inventors conducted further studies on a chemical composition of the base material that can form Mo-dissolved $M_{23}C_6$ carbide to restrict reduction in an amount of segregating B in grain boundaries even when MX carbo-nitride containing Nb transforms into a Z phase and an $M_2C_6$ carbide in its use under a high-temperature corrosive environment at 600 to 700° C. As a result, it was found that restricting the reduction in the amount of segregating B by the formation of the Mo-dissolved $M_{23}C_6$ carbide has a close relation with B, C, and Mo in the chemical composition described above. It was then found that the austenitic stainless steel weld joint can have an excellent polythionic acid SCC resistance, an excellent naphthenic acid corrosion resistance, and an excellent creep ductility of the base material at the same time when B, C, and Mo in the chemical composition of the base material described above satisfy Formula (1) even in use under the high-temperature corrosive environment at 600 to 700° C.:

$$B+0.004-0.9C+0.017Mo^2 \geq 0 \qquad (1)$$

where symbols of elements in Formula (1) are to be substituted by contents of corresponding elements (mass %).

The present inventors further conducted studies, and it was found as a result that, in a case where the base material of the austenitic stainless steel weld joint contains Cu, an optional element, containing Cu at 5.00% or less makes it possible to obtain an excellent creep strength as well as to keep a creep ductility, but setting an upper limit of a content of Cu at 1.70% or less makes it possible to further enhance the creep strength of the base material as well as to keep a higher creep ductility. The reason is considered as follows. In use under a high-temperature corrosive environment, Cu precipitates in grains, forming Cu phases. The Cu phases enhance creep strength but can degrade creep ductility. Accordingly, for the base material of the weld joint including the above chemical composition and satisfying Formula (1), it is more preferable that the content of Cu is 1.70% or less. When the content of Cu is 1.70% or less, it is possible to keep an excellent creep ductility more effectively.

The present inventors further conducted studies, and it was found as a result that the creep ductility of the base material is further enhanced when a content of Mo in the chemical composition of the base material of the austenitic stainless steel weld joint is set at 0.50% or more. The reason for this is unclear, but the following idea is conceivable. In the base material of the austenitic stainless steel weld joint having the above chemical composition satisfying Formula (1), when the content of Mo is additionally set at 0.50% or more, Mo further segregates in grain boundaries and forms its intermetallic compounds in use under a high-temperature corrosive environment at 600 to 700° C. This grain-boundary segregation and intermetallic compounds further enhance the grain boundary strength. As a result, the creep ductility is further enhanced. In particular, when the content of Mo in the base material is 1.00% or more, a very excellent creep ductility of the base material is obtained.

The present inventors further found that the austenitic stainless steel weld joint has the excellent polythionic acid SCC resistance and the excellent naphthenic acid corrosion resistance and is further provided with an excellent weldability when a chemical composition of the weld metal of the weld joint at a width-center position and at a thickness-center position of the weld metal consists of, in mass %, C: 0.050% or less, Si: 0.01 to 1.00%, Mn: 0.01 to 3.00%, P: 0.030% or less, S: 0.015% or less, Cr: 15.0 to 25.0%, Ni: 20.0 to 70.0%, Mo: 1.30 to 10.00%, Nb: 0.05 to 3.00%, N: 0.150% or less, B: 0.0050% or less, sol. Al: 0 to 1.000%, Cu: 0 to 2.50%, W: 0 to 1.0%, Co: 0 to 15.0%, V: 0 to 0.10%, Ti: 0 to 0.50%, Ta: 0 to 0.20%, Ca: 0 to 0.010%, Mg: 0 to 0.010%, and rare earth metals: 0 to 0.100%, with the balance being Fe and impurities, as compared with the base material having the above chemical composition.

Furthermore, the present inventors found that, when the above chemical composition of the weld metal preferably satisfies Formula (2), the austenitic stainless steel weld joint is excellent in the polythionic acid corrosion resistance and the naphthenic acid corrosion resistance, and is excellent in the creep ductility of its base material, and toughness of its weld metal after high temperature aging is enhanced.

$$0.012Cr-0.005Ni+0.013Mo+0.023Nb+0.02Al-0.004Co \leq 0.176 \quad (2)$$

where symbols of elements in Formula (2) are to be substituted by contents of corresponding elements (mass %).

The gist of the austenitic stainless steel weld joint according to the present embodiment that is made based on the findings described above is as follows.

An austenitic stainless steel weld joint according to [1] includes a base material and a weld metal, wherein a chemical composition of the base material consists of in mass %:
C: 0.030% or less;
Si: 0.10 to 1.00%;
Mn: 0.20 to 2.00%;
P: 0.040% or less;
S: 0.010% or less;
Cr: 16.0 to 25.0%;
Ni: 10.0 to 30.0%;
Mo: 0.10 to 5.00%;
Nb: 0.20 to 1.00%;
N: 0.050 to 0.300%;
sol. Al: 0.001 to 0.100%;
B: 0.0010 to 0.0080%/e;
Cu: 0 to 5.00%;
W: 0 to 5.0%;
Co: 0 to 1.0%;
V: 0 to 1.00%;
Ta: 0 to 0.20%;
Hf: 0 to 0.20%;
Ca: 0 to 0.010%;
Mg: 0 to 0.010%: and
rare earth metals: 0 to 0.100%,
with the balance being Fe and impurities, and
satisfying Formula (1), and
in the weld metal, at a width-center position and at a thickness-center position, a chemical composition of the weld metal consists of, in mass %:
C: 0.050% or less;
Si: 0.01 to 1.00%;
Mn: 0.01 to 3.00%;
P: 0.030% or less;
S: 0.015% or less;
Cr: 15.0 to 25.0%;
Ni: 20.0 to 70.0%;
Mo: 1.30 to 10.00%;
Nb: 0.05 to 3.00;
N: 0.150% or less;
B: 0.0050% or less;
sol. Al: 0 to 1.000%;
Cu: 0 to 2.50%;
W: 0 to 1.0%;
Co: 0 to 15.0%;
V: 0 to 0.10%;
Ti: 0 to 0.50%;
Ta: 0 to 0.20%;
Ca: 0 to 0.010%;
Mg: 0 to 0.010%: and
rare earth metals: 0 to 0.100%,
with the balance being Fe and impurities:

$$B+0.004-0.9C+0.017Mo^2 \geq 0 \quad (1)$$

where symbols of elements in Formula (1) are to be substituted by contents of corresponding elements (in mass %).

Here, the width-center position of the weld metal means a center position of a length (width) of the weld metal in a width direction, which is perpendicular to an extending direction of the weld metal. The thickness-center position of the weld metal means a t/2 depth position from a surface of the weld metal at the width-center position of the weld metal in a cross section of the weld metal perpendicular to the extending direction of the weld metal, and t mm is defined as the thickness of the weld metal in the cross section perpendicular to the extending direction of the weld metal.

In the austenitic stainless steel weld joint according to the present embodiment, the contents of elements in the chemical composition of the base material fall within the ranges described above and satisfy Formula (1), and the contents of elements of the chemical composition of the weld metal at the width-center position and at the thickness-center position fall within the ranges described above. Therefore, the austenitic stainless steel weld joint according to the present embodiment is excellent in polythionic acid SCC resistance and excellent in naphthenic acid corrosion resistance. Furthermore, the base material have an excellent creep ductility under a high-temperature corrosive environment at 600 to 700° C.

An austenitic stainless steel weld joint according to [2] is the austenitic stainless steel weld joint according to [1], wherein
the chemical composition of the base material contains one or more elements selected from the group consisting of:
Cu: 0.10 to 5.00%;
W: 0.1 to 5.0%;
Co: 0.1 to 1.0%;
V: 0.10 to 1.00%;
Ta: 0.01 to 0.20%;
Hf: 0.01 to 0.20%;
Ca: 0.001 to 0.010%;
Mg: 0.001 to 0.010%; and
rare earth metals: 0.001 to 0.100%.

An austenitic stainless steel weld joint according to [3] is the austenitic stainless steel weld joint according to [1] or [2], wherein
the chemical composition of the weld metal contains one or more elements selected from the group consisting of:
sol. Al: 0.001 to 1.000%,
Cu: 0.01 to 2.50%,
W: 0.1 to 1.0% A,
Co: 0.1 to 15.0%,
V: 0.01 to 0.10%,
Ti: 0.01 to 0.50%,
Ta: 0.01 to 0.20%,
Ca: 0.001 to 0.010%,
Mg: 0.001 to 0.010%, and
rare earth metals: 0.001 to 0.100%

An austenitic stainless steel weld joint according to [4] is the austenitic stainless steel weld joint according to any one of [1] to [3], wherein
the chemical composition of the weld metal satisfies Formula (2):

$$0.012Cr-0.005Ni+0.013Mo+0.023Nb+0.02Al-0.004Co \leq 0.176 \quad (2)$$

where symbols of elements in Formula (2) are to be substituted by contents of corresponding elements (mass %).

In this case, the austenitic stainless steel weld joint is excellent in the polythionic acid corrosion resistance and the naphthenic acid corrosion resistance, is excellent in the creep ductility of its base material, and is further excellent in toughness of its weld metal after high temperature aging.

Hereafter, the austenitic stainless steel weld joint according to the present embodiment will be described in detail. The sign "%" following each element herein means mass % unless otherwise noted.

[Configuration of Austenitic Stainless Steel Weld Joint]

FIG. 1 is a plan view illustrating an example of an austenitic stainless steel weld joint 1 according to the present embodiment. Referring to FIG. 1, the austenitic stainless steel weld joint 1 according to the present embodiment includes a base material 10 and a weld metal 20. The weld metal 20 is formed by welding the paired base materials 10 of which beveled edges have been abutted against each other. Examples of the welding include gas tungsten arc welding (GTAW), shielded metal arc welding (SMAW), flux cored arc welding (FCAW), gas metal arc welding (GMAW), and submerged arc welding (SAW).

Figure 2:
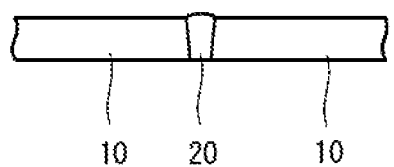
FIG. 2 is a cross-sectional view of the austenitic stainless steel weld joint illustrated in FIG. 1 that is cut in a weld metal width direction.

In FIG. 1, a direction in which the weld metal 20 extends is defined as a weld metal extending direction L, a direction that is perpendicular to the weld metal extending direction L in plan view is defined as a weld metal width direction W. and a direction perpendicular to the weld metal extending direction L and the weld metal width direction W is defined as a weld metal thickness direction T. FIG. 2 is a cross-sectional view of the austenitic stainless steel weld joint 1 illustrated in FIG. 1 that is cut in the weld metal width direction W. As illustrated in FIG. 1 and FIG. 2, the weld metal 20 is disposed between the paired base materials 10.

Figure 3:
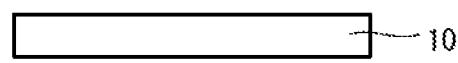
FIG. 3 is a cross-sectional view of the austenitic stainless steel weld joint illustrated in FIG. 1 that is cut in a weld metal extending direction L.
Figure 4:
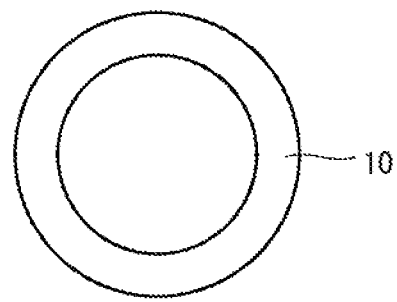
FIG. 4 is a cross-sectional view of an austenitic stainless steel weld joint different from that illustrated in FIG. 3 that is cut in the weld metal extending direction L.

FIG. 3 is a cross-sectional view of the austenitic stainless steel weld joint 1 illustrated in FIG. 1 that is cut in the weld metal extending direction L, and FIG. 4 is a cross-sectional view of an austenitic stainless steel weld joint 1 different from that illustrated in FIG. 3 that is cut in the weld metal extending direction L. As illustrated in FIG. 3, the base materials 10 may each be a plate material in its shape, or as illustrated in FIG. 4, the base materials 10 each may be a pipe in its shape. Although not illustrated, the base materials 10 may each be a steel bar or a section shape steel in its shape. Hereafter, the base material 10 and the weld metal 20 will be described.

[Base Material 10]
[Chemical Composition]

The base material 10 of the austenitic stainless steel weld joint according to the present embodiment has a chemical composition containing the following elements.

C: 0.030% or Less

Carbon (C) is contained unavoidably. That is, a content of C is more than 0%. When the austenitic stainless steel weld joint according to the present embodiment is in use under the high-temperature corrosive environment at 600 to 700° C. C produces $M_{23}C_6$ carbide in grain boundaries in the base material, degrading polythionic acid SCC resistance of the base material 10. Accordingly, the content of C is 0.030% or less. An upper limit of the content of C is preferably 0.020%, more preferably 0.018%, still more preferably 0.016%, even still more preferably 0.015%. The content of C is preferably as low as possible. However, if the content of C is decreased excessively, a production cost increases. Accordingly, in industrial production, a lower limit of the content of C is preferably 0.001%, more preferably 0.002%.

Si: 0.10 to 1.00%

Silicon (Si) deoxidizes steel. In addition, Si enhances oxidation resistance and steam oxidation resistance of the base material 10. An excessively low content of Si fails to provide the effects described above. Meanwhile, an excessively high content of Si causes a sigma phase (a phase) to precipitate in the base material 10, degrading toughness of the steel. Accordingly, a content of Si is 0.10 to 1.00%. A lower limit of the content of Si is preferably 0.15%, more preferably 0.17%, still more preferably 0.18%, even still more preferably 0.20%, yet even still more preferably 0.25%. An upper limit of the content of Si is preferably 0.75%, more preferably 0.70%, still more preferably 0.50%, even still more preferably 0.45%.

Mn: 0.20 to 2.00%

Manganese (Mn) deoxidizes steel. In addition, Mn stabilizes austenite, enhancing the creep strength of the base material 10. An excessively low content of Mn fails to provide the effects described above. Meanwhile, an excessively high content of Mn rather degrades creep strength of the base material 10. Accordingly, the content of Mn is 0.20 to 2.00%. A lower limit of the content of Mn is preferably 0.30%, more preferably 0.40%, still more preferably 0.50%, even still more preferably 0.60%, yet even still more preferably 0.70%, yet even still more preferably 0.80%. An upper limit of the content of Mn is preferably 1.80%, more preferably 1.70%, still more preferably 1.60%, even still more preferably 1.50%.

P: 0.040% or Less

Phosphorus (P) is an impurity contained unavoidably. That is, a content of P is more than 0%. P degrades hot workability and toughness of steel. Accordingly, the content of P is 0.040% or less. An upper limit of the content of P is preferably 0.035%, more preferably 0.032%, still more preferably 0.028%, even still more preferably 0.026%. The content of P is preferably as low as possible. However, if the content of P is decreased excessively, a production cost increases. Therefore, in industrial production, a lower limit of the content of P is preferably 0.001%, more preferably 0.002%.

S: 0.010% or Less

Sulfur (S) is an impurity contained unavoidably. That is, a content of S is more than 0%. S degrades hot workability and creep ductility of steel. Accordingly, the content of S is 0.010% or less. An upper limit of the content of S is preferably 0.007%, more preferably 0.006%, still more preferably 0.005%. The content of S is preferably as low as possible. However, if the content of S is decreased excessively, a production cost increases. Accordingly, in industrial production, a lower limit of the content of S is preferably 0.001%.

Cr: 16.0 to 25.0%

Chromium (Cr) enhances polythionic acid SCC resistance and naphthenic acid corrosion resistance of the base material 10. An excessively low content of Cr fails to provide the effects described above. In contrast, an excessively high Cr content degrades creep strength of the base material 10 and toughness of steel. Accordingly, a content of Cr is 16.0 to 25.0%. A lower limit of the content of Cr is preferably 16.5%, more preferably 17.0%, still more preferably 17.2%, even still more preferably 17.4%. An upper limit of the content of Cr is preferably 24.0%, more preferably 23.0%, more preferably 22.0%.

Ni: 10.0 to 30.0%

Nickel (Ni) stabilizes austenite, enhancing creep strength of the base material 10. Ni further enhances polythionic acid SCC resistance and naphthenic acid corrosion resistance of the base material. An excessively low content of Ni fails to provide the effect described above. In contrast, an excessively high content of Ni results in saturation of the effect described above and in addition, increases production costs. Accordingly, a content of Ni is 10.0 to 30.0%. A lower limit of the content of Ni is preferably 11.0%, more preferably 12.0%, still more preferably 13.0%, even still more preferably 13.5%. An upper limit of the content of Ni is preferably 27.0%, more preferably 25.0%, still more preferably 22.0%, even still more preferably 20.0%, yet even still more preferably 18.0%, yet even still more preferably 17.0%.

Mo: 0.10 to 5.00% Molybdenum (Mo) restricts formation of $M_{23}C_6$ carbide in grain boundaries in use under a high-temperature corrosive environment at 600 to 700° C. This enhances polythionic acid SCC resistance of the base material 10. Furthermore, when the austenitic stainless steel weld joint 1 is used under the high-temperature corrosive environment, Mo dissolved in the base material 10 binds with S in the high-temperature corrosive environment to form a sulfide film on surfaces of the base material 10. The formation of this sulfide film increases the naphthenic acid corrosion resistance. In addition, in use under the high-temperature corrosive environment at 600 to 700° C., Mo restricts dissolution of B into $M_{23}C_6$ carbide when MX carbo-nitride of Nb transforms into the $M_{23}C_6$ carbide, restricting reduction of an amount of segregating B in grain boundaries under the high-temperature corrosive environment. This allows a sufficient creep ductility to be obtained in the high-temperature corrosive environment. An excessively low content of Mo fails to provide these effects. In contrast, an excessively high content of Mo degrades stability of austenite. Accordingly, a content of Mo is 0.10 to 5.00%. A lower limit of the content of Mo is preferably 0.20%, more preferably 0.30%.

When the content of Mo is 0.50% or more, Mo segregates in grain boundaries and forms intermetallic compounds, further enhancing grain boundary strength. In this case, a further excellent creep ductility can be obtained under the high-temperature corrosive environment. Accordingly, a lower limit of the content of Mo is more preferably 0.50%, still more preferably 0.80%, still more preferably 1.00%, still more preferably 2.00%. When the content of Mo is 1.00% or more, a particularly excellent creep ductility of the base material 10 is obtained. An upper limit of the content of Mo is preferably 4.50%, more preferably 4.00%.

Nb: 0.20 to 1.00%

Niobium (Nb) combines with C in use under a high-temperature corrosive environment at 600 to 700° C. to form MX carbo-nitride, reducing an amount of dissolved C in the base material 10. This enhances polythionic acid SCC resistance and naphthenic acid corrosion resistance of the base material 10. The formed MX carbo-nitride of Nb also enhances creep strength of the base material 10. An excessively low content of Nb fails to provide the effects described above. In contrast, an excessively high content of Nb causes 6 ferrite to be produced, degrading creep strength of the base material 10, toughness, and weldability of steel. Accordingly, a content of Nb is 0.20 to 1.00%. A lower limit of the content of Nb is preferably 0.25%, more preferably 0.28%, still more preferably 0.30%, even still more preferably 0.32%. An upper limit of the content of Nb is preferably 0.90%, more preferably 0.80%, still more preferably 0.70%, even still more preferably 0.65%.

N: 0.050 to 0.300%

Nitrogen (N) is dissolved in a matrix (parent phase) to stabilize austenite, enhancing creep strength of the base material 10. In addition, N forms its fine carbo-nitride in grains, enhancing creep strength of the base material 10. That is, N contributes to the creep strength of the base material 10 through both solid-solution strengthening and precipitation strengthening. An excessively low content of N fails to provide the effects described above. In contrast, an excessively high content of N causes Cr nitride to be formed in grain boundaries, degrading polythionic acid SCC resistance and the naphthenic acid corrosion resistance in a welding heat affected zone (HAZ) of the base material 10. In addition, an excessively high content of N also degrades workability of steel. Accordingly, a content of N is 0.050 to 0.300%. A lower limit of the content of N is preferably 0.060%, more preferably 0.070%, still more preferably 0.080%. An upper limit of the content of N is preferably 0.250%, more preferably 0.200%, still more preferably 0.190%.

Sol. Al: 0.001 to 0.100%

Aluminum (Al) deoxidizes steel. An excessively low content of Al fails to provide the above effect. In contrast, an excessively high content of Al degrades cleanliness of steel, degrading workability and ductility of the steel. Accordingly, a content of Al is 0.001 to 0.100%. A lower limit of the content of Al is preferably 0.002%, more preferably 0.003%. An upper limit of the content of Al is preferably 0.050%, more preferably 0.030%, more preferably 0.025%.

In the present embodiment, the content of Al means a content of acid-soluble Al (sol.Al).

B: 0.0010 to 0.0080%

Boron (B) segregates in grain boundaries in use under a high-temperature corrosive environment at 600 to 700° C., enhancing grain boundary strength. As a result, creep ductility of the base material 10 can be enhanced under the high-temperature corrosive environment at 600 to 700° C. An excessively low content of B fails to provide the effects described above. In contrast, an excessively high content of B degrades weldability and hot workability at high temperature. Furthermore, a content of B in the weld metal increases during welding, which causes solidification cracking in the weld metal 20. Accordingly, a content of B is 0.0010 to 0.0080%. A lower limit of the content of B is preferably 0.0015%, more preferably 0.0018%, more preferably 0.0020%, more preferably 0.0022%. An upper limit of the content of B is preferably less than 0.0060%, more preferably 0.0050%.

The balance of the chemical composition of the base material 10 of the austenitic stainless steel weld joint 1 according to the present embodiment is Fe and impurities. Here, the impurities mean elements that are mixed from ores and scraps used as raw material, a producing environment, or the like when the above base material 10 is produced in an industrial manner, and are allowed to be mixed within ranges within which the impurities have no adverse effect on the base material 10 of the austenitic stainless steel weld joint 1 of the present embodiment.

[Optional Elements]

[First Group Optional Elements]

The chemical composition of the base material 10 of the austenitic stainless steel weld joint 1 according to the present embodiment may further contain, in lieu of a part of Fe, one or more elements selected from the group consisting of Cu, W, and Co. These elements all enhance creep strength of the base material 10.

Cu: 0 to 5.00%

Copper (Cu) is an optional element and need not be contained. That is, a content of Cu may be 0%. When contained, Cu precipitates in use under a high-temperature corrosive environment at 600 to 700° C. in a form of Cu phases in grains, exerting precipitation strengthening to enhance creep strength of the base material 10. However, an excessively high content of Cu degrades hot workability and weldability of steel. Accordingly, the content of Cu is 0 to 5.00%. In order to enhance the creep strength of the base material 10 of the austenitic stainless steel weld joint 1 more effectively, a lower limit of the content of Cu is preferably more than 0%, more preferably 0.10%, still more preferably 0.11%, even still more preferably 0.12%, yet even still more preferably 2.00%, yet even still more preferably 2.50%. An upper limit of the content of Cu is preferably 4.50%, more preferably 4.00%, still more preferably 3.80%, even still more preferably 3.70%, yet even still more preferably 3.60%, yet even still more preferably 3.50%, yet even still more preferably 1.90%. In particular, in order to keep a more excellent creep ductility in the high-temperature corrosive environment at 600 to 700° C., a preferable content of Cu is 0 to 1.70%, and a more preferable upper limit of the content of Cu is 1.60%.

W: 0 to 5.0%

Tungsten (W) is an optional element and may not be contained. That is, a content of W may be 0%. When contained, W is dissolved in a matrix (parent phase), enhancing creep strength of the base material 10 of the austenitic stainless steel weld joint 1. However, an excessively high content of W degrades stability of austenite, degrading creep strength and toughness of the base material 10. Accordingly, a content of W is 0 to 5.0%. A lower limit of the content of W is preferably more than 0%, more preferably 0.1%, still more preferably 0.2%, even still more preferably 0.5%. An upper limit of the content of W is preferably 4.5%, more preferably 4.0%, still more preferably 3.5%.

Co: 0 to 1.0%

Cobalt (Co) is an optional element and need not be contained. That is, a content of Co may be 0%. When contained, Co stabilizes austenite, enhancing creep strength of the base material 10 of the austenitic stainless steel weld joint 1. However, an excessively high content of Co increases a raw-material cost. Accordingly, a content of Co is 0 to 1.0%. A lower limit of the content of Co is preferably more than 0%, more preferably 0.1%, still more preferably 0.2%, even still more preferably 0.3%. An upper limit of the content of Co is preferably 0.9%, more preferably 0.8%.

[Second Group Optional Elements]

The chemical composition of the base material 10 of the austenitic stainless steel weld joint 1 according to the present embodiment may further contain, lieu of a part of Fe, one or more elements selected from the group consisting of V, Ta, and Hf. These elements all enhance polythionic acid SCC resistance and creep strength of the base material.

V: 0 to 1.00%

Vanadium (V) is an optional element and need not be contained. That is, a content of V may be 0%. When contained, V combines with C to form its carbo-nitride in use under a high-temperature corrosive environment at 600 to 700° C., so as to reduce dissolved C, enhancing polythionic acid SCC resistance of the base material 10. The formed V carbo-nitride also enhances creep strength of the base material 10. However, an excessively high content of V causes δ ferrite to be produced, degrading creep strength, toughness, and weldability of the base material 10. Accordingly, a content of V is 0 to 1.00%. In order to enhance the polythionic acid SCC resistance and the creep strength more effectively, a lower limit of the content of V is preferably more than 0%, more preferably 0.10%. An upper limit of the content of V is preferably 0.90%, more preferably 0.80%.

Ta: 0 to 0.20%

Tantalum (Ta) is an optional element and need not be contained. That is, a content of Ta may be 0%. When contained, Ta combines with C to form its carbo-nitride in use under a high-temperature corrosive environment at 600 to 700° C., so as to reduce dissolved C, enhancing polythionic acid SCC resistance of the base material 10. The formed Ta carbo-nitride also enhances creep strength. However, an excessively high content of Ta causes δ ferrite to be produced, degrading creep strength, toughness, and weldability of the base material 10. Accordingly, a content of Ta is 0 to 0.20%. In order to enhance the polythionic acid SCC resistance and the creep strength more effectively, a lower limit of the content of Ta is preferably more than 0%, more preferably 0.01%, more preferably 0.02%. An upper limit of the content of Ta is preferably 0.18%, more preferably 0.16%.

Hf: 0 to 0.20%

Hafnium (Hf) is an optional element and need not be contained. That is, a content of Hf may be 0%. When contained, Hf combines with C to form its carbo-nitride in use under a high-temperature corrosive environment at 600 to 700° C., so as to reduce dissolved C, enhancing polythionic acid SCC resistance of the base material 10. The formed Hf carbo-nitride also enhances creep strength of the base material 10. However, an excessively high content of Hf causes δ ferrite to be produced, degrading creep strength, toughness, and weldability of the base material 10. Accordingly, a content of Hf is 0 to 0.20%. A lower limit of the content of Hf is preferably more than 0%, more preferably 0.01%, more preferably 0.02%. An upper limit of the content of Hf is preferably 0.18%, more preferably 0.16%.

[Third Group Optional Elements]

The chemical composition of the base material 10 of the austenitic stainless steel weld joint 1 according to the present embodiment may further contain, in lieu of a part of Fe, one or more elements selected from the group consisting of Ca, Mg, and rare earth metals (REMs). These elements all enhance hot workability and creep ductility of the base material.

Ca: 0 to 0.010%

Calcium (Ca) is an optional element and need not be contained. That is, a content of Ca may be 0%. When contained, Ca immobilizes O (oxygen) and S (sulfur) in forms of its inclusions, enhancing hot workability and creep ductility of the base material 10. However, an excessively high content of Ca degrades hot workability and creep ductility of the base material 10. Accordingly, a content of Ca is 0 to 0.010%. A lower limit of the content of Ca is preferably more than 0%, more preferably 0.001%, more preferably 0.002%. An upper limit of the content of Ca is preferably 0.008%, more preferably 0.006%.

Mg: 0 to 0.010%

Magnesium (Mg) is an optional element and need not be contained. That is, a content of Mg may be 0%. When contained, Mg immobilizes O (oxygen) and S (sulfur) in forms of its inclusions, enhancing hot workability and creep ductility of the base material 10. However, an excessively high content of Mg degrades hot workability and creep ductility of the base material 10. Accordingly, a content of Mg is 0 to 0.010%. A lower limit of the content of Mg is preferably more than 0%, more preferably 0.001%, more preferably 0.002%. An upper limit of the content of Mg is preferably 0.008%, more preferably 0.006%.

Rare Earth Metal: 0 to 0.100%

Rare earth metal (REM) is an optional element and needs not be contained. That is, a content of REMs may be 0%. When contained, REM immobilizes O (oxygen) and S (sulfur) in forms of its inclusions, enhancing hot workability and creep ductility of the base material. However, an excessively high content of REM degrades hot workability and creep ductility of the base material. Accordingly, a content of REM is 0 to 0.10%. A lower limit of the content of REM is preferably more than 0%, more preferably 0.001%, more preferably 0.002%. An upper limit of the content of REM is preferably 0.080%, more preferably 0.060%.

REM herein contains at least one element of Sc, Y, and lanthanoid (La with atomic number 57, to Lu, with atomic number 71), and the content of REM means a total content of these elements.

[Formula (1)]

The above chemical composition of the base material 10 further satisfies Formula (1).

$$B+0.004-0.9C+0.017Mo^2 \geq 0 \quad (1)$$

Symbols of elements in Formula (1) are to be substituted by contents of corresponding elements (in mass %).

As described above, the present embodiment involves both setting the content of C at 0.030% or less to increase the polythionic acid SCC resistance and the naphthenic acid corrosion resistance, and making 0.20 to 1.00% of Nb contained. This allows MX carbo-nitride of Nb to be produced in use under a high-temperature corrosive environment at 600 to 700° C., reducing an amount of dissolved C. However, the MX carbo-nitride of Nb transforms into a Z phase and an M-$C_6$ carbide in long-time use under the above high-temperature corrosive environment because the MX carbo-nitride of Nb is a metastable phase. B segregating in grain boundaries is dissolved in the $M_{23}C_6$ carbide, and an amount of segregating B in the grain boundaries is reduced. As a result, the creep ductility of the base material 10 deteriorates.

However, when Mo is dissolved in the $M_{23}C_6$ carbide to form an "Mo-dissolved $M_{23}C_6$ carbide", B is hard to be dissolved in the Mo-dissolved $M_{23}C_6$ carbide. Therefore, the amount of segregating B in the grain boundaries is kept, which enables obtaining an excellent polythionic acid SCC resistance and an excellent naphthenic acid corrosion resistance, as well as an excellent creep ductility of the base material 10.

Let F1 be defined as F1=B+0.004−0.9C+0.017$Mo^2$. F1 is an index indicating a ratio of an Mo-dissolved $M_2C_6$ carbide to a plurality of kinds of $M_2C_6$ carbides formed in the base material 10 in use under a high-temperature corrosive environment. If F1 is zero or more, the ratio of the Mo-dissolved $M_{23}C_6$ carbide is high even when the plurality of kinds of $M_{23}C_6$ carbides are formed in the steel in use under the high-temperature corrosive environment. Therefore, B segregating in grain boundaries is hard to be dissolved in the $M_{23}C_6$ carbides, and therefore an amount of B segregating in the grain boundaries is kept. Therefore, the base material 10 can have an excellent polythionic acid SCC resistance, an excellent naphthenic acid corrosion resistance, and an excellent creep ductility at the same time. Accordingly, F1 is zero (0.00000) or more. F1 is preferably 0.00100 or more, more preferably 0.00200 or more, more preferably 0.00400 or more, more preferably 0.00500 or more, more preferably 0.00800 or more, more preferably 0.01000 or more, more preferably 0.02000 or more.

When the above chemical composition of the base material contains Cu, it is preferable that the upper limit of the content of Cu is 1.70% or less as described above. Considering enhancing a creep strength as well as obtaining an excellent creep ductility, the content of Cu is preferably more than 0% to 1.70%. When the content of Cu is 1.70% or less, a Cu phase is subjected to precipitation strengthening, which makes it possible to keep the excellent creep ductility of the base material with the excellent creep strength obtained.

In the above chemical composition of the base material, a lower limit of the content of Mo is preferably 0.50%. In the case, in use under a high-temperature corrosive environment at 600 to 700° C., Mo additionally segregates in grain boundaries and forms intermetallic compounds. This grain-boundary segregation and intermetallic compounds further enhance the grain boundary strength. As a result, the creep ductility of the base material is further enhanced. Accordingly, the lower limit of the content of Mo is preferably 0.50%. When the lower limit of the content of Mo is 1.00% or more, the creep ductility of the base material is enhanced markedly. Note that, when the content of Mo is 0.50% or more, the F1 value is preferably 0.00500 or more, more preferably 0.00800 or more, still more preferably 0.01000 or more, even still more preferably 0.02000 or more.

[Weld Metal 20]

[Chemical Composition]

Figure 5:
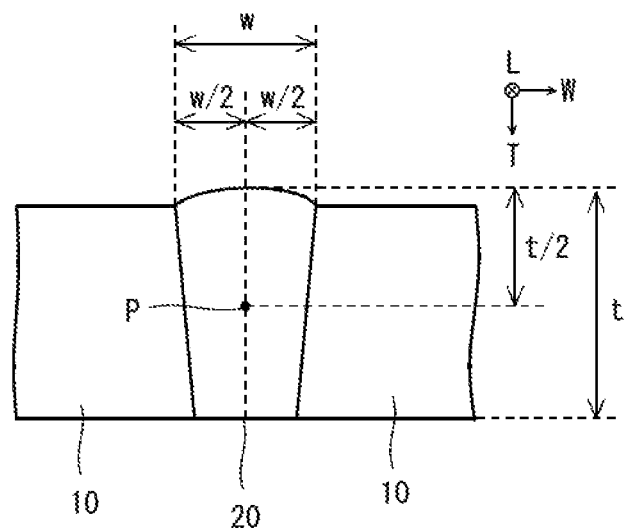
FIG. 5 is a cross-sectional view of the austenitic stainless steel weld joint according to the present embodiment that is perpendicular to the weld metal extending direction L.

FIG. 5 is a cross-sectional view of the austenitic stainless steel weld joint 1 according to the present embodiment that is perpendicular to the weld metal extending direction L. Referring to FIG. 5, in the cross section of the weld metal 20 perpendicular to the weld metal extending direction L, a width of an outermost surface of the weld metal 20 is defined as W (mm). In addition, a thickness of the weld metal 20 at a center position of the width W is defined as t (mm). A chemical composition of a region P at a width-center position and at a thickness-center position of the weld metal 20 (i.e., at a t/2 depth position from the outermost surface of the weld metal 20) contains the following elements.

C: 0.050% or Less

Carbon (C) is contained unavoidably. That is, a content of C is more than 0%. When the austenitic stainless steel weld joint 1 according to the present embodiment is in use under the high-temperature corrosive environment at 600 to 700° C., C produces $M_3CE$ carbide in grain boundaries in the weld metal 20, degrading polythionic acid SCC resistance and naphthenic acid corrosion resistance of the weld metal 20. Accordingly, the content of C is 0.050% or less. An upper limit of the content of C is preferably 0.040%, more preferably 0.030%, still more preferably 0.025%, even still more preferably 0.020%. The content of C is preferably as low as possible. However, if the content of C is decreased excessively, a production cost increases. Accordingly, in industrial production, a lower limit of the content of C is preferably 0.001%, more preferably 0.005%.

Si: 0.01 to 1.00%

Silicon (Si) deoxidizes the weld metal 20 during welding. An excessively low content of Si fails to provide this effect. Meanwhile, an excessively high content of Si degrades toughness of the weld metal 20. Accordingly, a content of Si is 0.01 to 1.00%. A lower limit of the content of Si is preferably 0.02%, more preferably 0.03%, still more preferably 0.10%. An upper limit of the content of Si is preferably 0.80%, more preferably 0.65%, still more preferably 0.40%, even still more preferably 0.35%.

Mn: 0.01 to 3.00%:

Manganese (Mn) deoxidizes the weld metal 20 during welding. An excessively low content of Mn results in failure to provide this effect. Meanwhile, an excessively high content of Mn degrades creep strength of the weld metal 20. Accordingly, the content of Mn is 0.01 to 3.00%. A lower limit of the content of Mn is preferably 0.05%, more preferably 0.08%, still more preferably 0.10%, even still more preferably 0.14%, yet even still more preferably 0.16%. An upper limit of the content of Mn is preferably 2.70%, more preferably 2.50%, still more preferably 2.30%.

P: 0.030% or Less

Phosphorus (P) is an impurity contained unavoidably. That is, a content of P is more than 0%. P degrades toughness of the weld metal. In addition, P increases hot cracking susceptibility of the weld metal 20. Accordingly, the content of P is to be 0.030% or less. An upper limit of the content of P is preferably 0.025%, more preferably 0.020%. The content of P is preferably as low as possible. However, if the content of P is decreased excessively, a production cost increases. Therefore, in industrial production, a lower limit of the content of P is preferably 0.001%, more preferably 0.002%.

S: 0.015% or Less

Sulfur (S) is an impurity contained unavoidably. That is, a content of S is more than 0%. S degrades ductility of the weld metal, enhancing hot cracking susceptibility of the weld metal 20. Accordingly, the content of S is 0.015% or less. An upper limit of the content of S is preferably 0.010%, more preferably 0.007%. The content of S is preferably as low as possible. However, if the content of S is decreased excessively, a production cost increases. Accordingly, in industrial production, a lower limit of the content of S is preferably 0.001%, more preferably 0.002%.

Cr: 15.0 to 25.0%

Chromium (Cr) enhances polythionic acid SCC resistance and naphthenic acid corrosion resistance of the weld metal 20. In addition, Cr enhances oxidation resistance, steam oxidation resistance, high-temperature corrosion resistance, and the like. An excessively low content of Cr fails to provide the effects described above. In contrast, an excessively high Cr content degrades creep strength and toughness of the weld metal 20. Accordingly, a content of Cr is 15.0 to 25.0%. A lower limit of the content of Cr is preferably 16.5%, more preferably 17.0%. An upper limit of the content of Cr is preferably 24.0%, more preferably 23.0%.

Ni: 20.0 to 70.0%

Nickel (Ni) stabilizes austenite, enhancing creep strength of the weld metal 20. In addition, Ni enhances polythionic acid SCC resistance and naphthenic acid corrosion resistance of the weld metal 20. An excessively low content of Ni fails to provide the effect described above. In contrast, an excessively high content of Ni results in saturation of the effect described above and in addition, increases production costs. Accordingly, the content of Ni is 20.0 to 70.0%. A lower limit of the content of Ni is preferably 21.0%, more preferably 23.0%, still more preferably 25.0%, even still more preferably 27.0%. An upper limit of the content of Ni is preferably 60.0%, more preferably 55.0%, still more preferably 50.0%.

Mo: 1.30 to 10.00%

Molybdenum (Mo) restricts formation of $M_{23}C_6$ carbide in grain boundaries in the weld metal 20 in use under a high-temperature corrosive environment at 600 to 700° C. This enhances polythionic acid SCC resistance of the weld metal 20. Furthermore, when the weld joint is used under the high-temperature corrosive environment. Mo dissolved in the weld metal 20 binds with S in the high-temperature corrosive environment to form a sulfide film on a surface of the weld metal 20. The formation of this sulfide film increases naphthenic acid corrosion resistance of the weld metal 20. In addition, in use under the high-temperature corrosive environment at 600 to 700° C., Mo restricts dissolution of B into $M_{23}C_6$ carbide when MX carbo-nitride of Nb transforms into the $M_{23}C_6$ carbide, restricting reduction of an amount of segregating B in grain boundaries under the high-temperature corrosive environment. This allows a sufficient creep ductility to be obtained under the high-temperature corrosive environment. An excessively low content of Mo results in failure to provide these effects. In contrast, an excessively high content of Mo degrades stability of austenite. Accordingly, the content of Mo is 1.30 to 10.00%. A lower limit of the content of Mo is preferably 1.40%, more preferably 1.50%, still more preferably 2.00%, even still more preferably 3.00%, yet even still more preferably 4.00%, yet even still more preferably more than 5.00%. An upper limit of the content of Mo is preferably 9.00%, more preferably 8.50%.

Nb: 0.05 to 3.00%,

Niobium (Nb) combines with C in use under a high-temperature corrosive environment at 600 to 700° C. to form MX carbo-nitride, reducing an amount of dissolved C in the weld metal 20. This enhances polythionic acid SCC resistance of the weld metal 20. The formed MX carbo-nitride of Nb also enhances creep strength. However, an excessively high content of Nb causes 6 ferrite to be produced, degrading long-term creep strength, toughness, and weldability of the weld metal 20. Accordingly, a content of Nb is 0.05 to 3.00%. A lower limit of the content of Nb is preferably 0.06%, more preferably 0.07%, still more preferably 0.10%, even still more preferably 0.15%, yet even still more preferably 0.18%, yet even still more preferably 0.20%. An upper limit of the content of Nb is preferably 2.90%, more preferably 2.50%, still more preferably 2.00%.

N: 0.150% or Less

Nitrogen (N) is unavoidably contained. That is, a content of N is more than 0%. N is dissolved in a matrix (parent phase) to stabilize austenite, enhancing creep strength of the weld metal 20. In addition. N forms its fine carbo-nitride in grains, enhancing creep strength of the weld metal 20. That is, N contributes to creep strength of the weld metal through both solid-solution strengthening and precipitation strengthening. However, an excessively high content of N causes Cr nitride to be formed in grain boundaries, degrading polythionic acid SCC resistance and naphthenic acid corrosion resistance in the weld metal 20. In addition, the excessively high content of N degrades ductility of the weld metal 20. Accordingly, the content of N is 0.150% or less. A lower limit of the content of N is preferably 0.010%, more preferably 0.050%, still more preferably 0.080%, even still more preferably 0.100%. An upper limit of the content of N is preferably 0.140%, more preferably 0.130%.

B: 0.0050% or Less

Boron (B) is unavoidably contained. That is, a content of B is more than 0%. B segregates in grain boundaries in use under a high-temperature corrosive environment at 600 to 700° C., enhancing grain boundary strength. As a result, creep ductility of the weld metal 20 can be enhanced under the high-temperature corrosive environment at 600 to 700° C. Furthermore, B enhances creep strength of the weld metal 20 under the high-temperature corrosive environment at 600 to 700° C. However, an excessively high content of B causes solidification cracking in the weld metal 20 during welding. Accordingly, in the chemical composition of the weld metal 20, the content of B is 0.0050% or less. A lower limit of the content of B is preferably 0.0001%, more preferably 0.0005%, still more preferably 0.0010%, even still more preferably 0.0015%, yet even still more preferably 0.0020%, yet even still more preferably 0.0030%. In particular, when the content of B in the weld metal 20 is 0.0030% or more, an excellent creep strength of the weld joint 1 is obtained. An upper limit of the content of B is preferably 0.0045%, more preferably 0.0040%.

The balance of the chemical composition of the weld metal 20 of the austenitic stainless steel weld joint 1 according to the present embodiment is Fe and impurities. Here, the impurities mean elements that are mixed from welding material being raw material and an environment of welding when the weld metal 20 is formed, and are allowed to be mixed within ranges within which the impurities have no adverse effect on the weld metal 20.

[Optional Elements]

[First Group Optional Elements]

The chemical composition of the weld metal 20 of the austenitic stainless steel weld joint 1 according to the present embodiment may further contain Al, in lieu of a part of Fe.

Sol. Al: 0 to 1.000%

Aluminum (Al) is an optional element and need not be contained. That is, a content of Al may be 0%. When contained, Al deoxidizes the weld metal 20 during welding. However, an excessively high content of Al degrades ductility of the weld metal 20. Accordingly, the content of Al is 0 to 1.000%. A lower limit of the content of Al is preferably more than 0%, more preferably 0.001%, still more preferably 0.002%, even still more preferably 0.010%, yet even still more preferably 0.050%. An upper limit of the content of Al is preferably 0.850%, more preferably 0.800%. In the present embodiment, the content of Al means a content of acid-soluble Al (sol. Al).

[Second Group Optional Elements]

The chemical composition of the weld metal 20 according to the present embodiment may further contain, in lieu of a part of Fe, one or more elements selected from the group consisting of Cu, W, and Co. These elements all enhance creep strength of the weld metal 20.

Cu: 0 to 2.50%

Copper (Cu) is an optional element and need not be contained. That is, a content of Cu may be 0%. When contained, Cu precipitates in use under a high-temperature corrosive environment at 600 to 700° C. in a form of Cu phases in grains, exerting precipitation strengthening to enhance creep strength of the weld metal 20. However, an excessively high content of Cu degrades weldability of the weld metal 20, which may cause cracking during welding. Accordingly, the content of Cu is 0 to 2.50%. In order to enhance creep strength of the weld metal 20 more effectively, a lower limit of the content of Cu is preferably more than 0%, more preferably 0.01%, still more preferably 0.05%, even still more preferably 0.10%, yet even still more preferably 0.50%, yet even still more preferably 1.00%, yet even still more preferably 1.20%. An upper limit of the content of Cu is preferably 2.30%, more preferably 2.10%, still more preferably 1.90%, even still more preferably 1.80%, yet even still more preferably 1.70%.

W: 0 to 1.0%

Tungsten (W) is an optional element and may not be contained. That is, a content of W may be 0%. When contained, W is dissolved in the weld metal 20 to enhance creep strength of the weld metal 20 in use in the high-temperature corrosive environment at 600 to 700° C. However, an excessively high content of W degrades stability of austenite, degrading creep strength and toughness of the weld metal 20. Accordingly, the content of W is 0 to 1.0%. A lower limit of the content of W is preferably more than 0%, more preferably 0.1%, still more preferably 0.2%. An upper limit of the content of W is preferably 0.9%, more preferably 0.7%, still more preferably 0.5%.

Co: 0 to 15.0%

Cobalt (Co) is an optional element and need not be contained. That is, a content of Co may be 0%. When contained. Co stabilizes austenite, enhancing creep strength of the weld metal 20. However, an excessively high content of Co increases a raw-material cost. Accordingly, the content of Co is 0 to 15.0%. A lower limit of the content of Co is preferably more than 0%, more preferably 0.1%, still more preferably 1.0%, even still more preferably 2.0%, yet even still more preferably 2.51%. An upper limit of the content of Co is preferably 12.0%, more preferably 11.0%.

[Third Group Optional Elements]

The chemical composition of the weld metal 20 of the austenitic stainless steel weld joint 1 according to the present embodiment may further contain, in lieu of a part of Fe, one or more elements selected from the group consisting of V, Ti, and Ta. These elements all enhance polythionic acid SCC resistance and creep strength of steel.

V: 0 to 0.10%

Vanadium (V) is an optional element and need not be contained. That is, a content of V may be 0%. When contained, V combines with C to form its carbo-nitride in use under a high-temperature corrosive environment at 600 to 700° C., so as to reduce dissolved C, enhancing polythionic acid SCC resistance of the weld metal 20. The formed V carbo-nitride also enhances creep strength of the weld metal 20. However, an excessively high content of V degrades toughness and weldability of the weld metal 20. Accordingly, the content of V is 0 to 0.10%. A lower limit of the content of V is preferably more than 0%, more preferably 0.01%, still more preferably 0.02%. An upper limit of the content of V is preferably 0.09%, more preferably 0.08%.

Ti: 0 to 0.50%

Titanium (Ti) is an optional element and need not be contained. That is, a content of Ti may be 0%. When contained, Ti combines with C to form its carbide in use under a high-temperature corrosive environment at 600 to 700° C., so as to reduce dissolved C, enhancing polythionic acid SCC resistance of the weld metal 20. The formed Ti carbide also enhances creep strength of the weld metal 20. However, an excessively high content of Ti degrades toughness and weldability of the weld metal 20. Therefore, the content of Ti is 0 to 0.50%. A lower limit of the content of Ti is preferably more than 0%, more preferably 0.01%, still more preferably 0.02%, even still more preferably 0.10%, yet even still more preferably 0.15%. An upper limit of the content of Ti is preferably 0.45%, more preferably 0.40%.

Ta: 0 to 0.20%

Tantalum (Ta) is an optional element and need not be contained. That is, a content of Ta may be 0%. When contained, Ta combines with C to form its carbo-nitride in use under a high-temperature corrosive environment at 600 to 700° C., so as to reduce dissolved C, enhancing polythionic acid SCC resistance of the weld metal 20. The formed Ta carbo-nitride also enhances creep strength. However, an excessively high content of Ta degrades creep strength, toughness, and weldability of the weld metal 20. Accordingly, the content of Ta is 0 to 0.20%. In order to enhance the polythionic acid SCC resistance and the creep strength more effectively, a lower limit of the content of Ta is preferably more than 0%, more preferably 0.01%, still more preferably 0.02%. An upper limit of the content of Ta is preferably 0.18%, more preferably 0.16%.

[Fourth Group Optional Elements]

The chemical composition of the weld metal 20 of the austenitic stainless steel weld joint 1 according to the present embodiment may further contain, in lieu of a part of Fe, one or more elements selected from the group consisting of Ca, Mg, and rare earth metals (REMs). These elements all enhance deformability of the weld metal 20 at high temperature.

Ca: 0 to 0.010%

Calcium (Ca) is an optional element and need not be contained. That is, a content of Ca may be 0%. When contained, Ca immobilizes O (oxygen) and S (sulfur) in forms of its inclusions, enhancing reheat cracking resistance of the weld metal 20. However, an excessively high content of Ca rather degrades solidification cracking resistance of the weld metal 20. Accordingly, a content of Ca is 0 to 0.010%/e. A lower limit of the content of Ca is preferably more than 0%, more preferably 0.001%, still more preferably 0.002%. An upper limit of the content of Ca is preferably 0.008%, more preferably 0.006%.

Mg: 0 to 0.010%

Magnesium (Mg) is an optional element and need not be contained. That is, a content of Mg may be 0%. When contained, Mg immobilizes O (oxygen) and S (sulfur) in forms of its inclusions, enhancing reheat cracking resistance of the weld metal 20. However, an excessively high content of Mg rather degrades solidification cracking resistance of the weld metal 20 during hot working. Accordingly, the content of Mg is 0 to 0.010%. A lower limit of the content of Mg is preferably more than 0%, more preferably 0.001%. An upper limit of the content of Mg is preferably 0.008%, more preferably 0.006%.

Rare Earth Metal: 0 to 0.100%

Rare earth metal (REM) is an optional element and needs not be contained. That is, a content of REM may be 0%. When contained, REM immobilizes O (oxygen) and S (sulfur) in forms of its inclusions, enhancing reheat cracking resistance of the weld metal 20. However, an excessively high content of REM rather degrades solidification cracking resistance of the weld metal 20. Accordingly, the content of REM is 0 to 0.100%. A lower limit of the content of REM is preferably more than 0%, more preferably 0.001%, still more preferably 0.002%. An upper limit of the content of REM is preferably 0.080%, more preferably 0.060%.

The austenitic stainless steel weld joint 1 according to the present embodiment includes the base material 10 having the chemical composition described above and the weld metal 20 having the chemical composition described above. Therefore, the austenitic stainless steel weld joint 1 is excellent in polythionic acid SCC resistance and excellent in naphthenic acid corrosion resistance. Furthermore, the base material 10 has an excellent creep ductility under a high-temperature corrosive environment at 600 to 700° C.

[Formula (2)]

It is preferable that the chemical composition of the region P, which is at the width-center position and at the thickness-center position of the weld metal 20, further satisfies the following Formula (2):

$$0.012Cr - 0.005Ni + 0.013Mo + 0.023Nb + 0.02Al - 0.004Co \leq 0.176 \quad (2)$$

where symbols of elements in Formula (2) are to be substituted by contents of corresponding elements (mass %).

Let F2 be defined as $0.012Cr - 0.005Ni + 0.013Mo + 0.023Nb + 0.02Al - 0.004Co$. As described above, when the austenitic stainless steel weld joint 1 according to the present embodiment is used as a member of a welded structure of a chemical plant facility, the austenitic stainless steel weld joint 1 is used in the high-temperature corrosive environment at 600 to 700° C. when the chemical plant is in operation, as described above. Therefore, the weld metal 20 of the austenitic stainless steel weld joint 1 undergoes high temperature aging. In contrast, when the facility is stopped, a temperature of the austenitic stainless steel weld joint 1 decreases to normal temperature. The weld metal 20 is susceptible to high temperature aging at 600 to 700° C. more remarkably than the base material 10 due to reheating and solidifying segregation during welding. Therefore, the austenitic stainless steel weld joint 1 that is used in applications of which polythionic acid corrosion resistance and naphthenic acid corrosion resistance are required preferably has an excellent toughness even after the weld metal 20 undergoes the high temperature aging.

F2 is an index of toughness of the weld metal 20 after the weld metal 20 undergoes the high temperature aging. Ni and Co in F2 enhance toughness of the weld metal 20 when the elements in the chemical composition of the weld metal 20 fall within their ranges according to the present embodiment. That is, Ni and Co are elements for enhancing toughness of the weld metal in a usage environment of the austenitic stainless steel weld joint 1 according to the present embodiment. In contrast, Cr, Mo, Nb, and Al all form their precipitates through the high temperature aging at 600 to 700° C. The formation of the precipitates increases hardness of the weld metal 20 and thus degrades toughness. That is, Cr, Mo, Nb, and Al are elements for degrading toughness of the weld metal in a usage environment of the austenitic stainless steel weld joint 1 according to the present embodiment.

In F2, signs of Ni and Co, which are the elements for enhancing toughness of the weld metal, are set to be minus, and signs of Cr, Mo, Nb. and Al, which are the elements for degrading toughness of the weld metal, are set to be plus. When F2 is more than 0.176, the elements for degrading toughness of the weld metal have a proportion greater than that of the elements for enhancing toughness of the weld metal. In this case, the toughness of its weld metal 20 after the high temperature aging is decreased while the austenitic stainless steel weld joint 1 is excellent in the polythionic acid corrosion resistance and the naphthenic acid corrosion resistance, and is excellent in the creep ductility of its base material 10. Specifically, after the austenitic stainless steel weld joint 1 according to the present embodiment is subjected to aging treatment at 700° C. for 3000 hours, a Charpy impact value of the weld metal 20 at normal temperature (25° C. 15° C.) is less than 20 J/cm².

When F2 is 0.176 or less, the austenitic stainless steel weld joint 1 is excellent in the polythionic acid corrosion resistance and the naphthenic acid corrosion resistance, and is excellent in the creep ductility of its base material 10, and toughness of its weld metal 20 after high temperature aging is enhanced, on a precondition that the contents of the elements in the chemical composition of the base material 10 of the austenitic stainless steel weld joint 1 fall within the ranges according to the present embodiment and satisfy Formula (1), and the contents of elements of the chemical composition of the weld metal 20 at the width-center position and at the thickness-center position fall within the ranges according to the present embodiment. Specifically, after the austenitic stainless steel weld joint 1 according to the present embodiment is subjected to aging treatment at 700° C. for 3000 hours, a Charpy impact value of the weld metal 20 at normal temperature (25° C.±15° C.) is 20 J/cm² or more.

An upper limit of the F2 value is preferably 0.174, more preferably 0.172, still more preferably 0.170, even still more preferably 0.165.

As described above, in the austenitic stainless steel weld joint 1 according to the present embodiment, the contents of elements in the chemical composition of the base material 10 fall within the ranges described above and satisfy Formula (1), and the contents of elements of the chemical composition of the weld metal 20 at the width-center position and at the thickness-center position fall within the ranges described above. Therefore, in the austenitic stainless steel weld joint 1 according to the present embodiment, the base material 10 and the weld metal 20 are both excellent in polythionic acid SCC resistance and excellent in naphthenic acid corrosion resistance. Furthermore, the base material 10 has an excellent creep ductility under the high-temperature corrosive environment at 600 to 700° C. It is preferable that the chemical composition of the weld metal 20 at the width-center position and at the thickness-center position further satisfy Formula (2). In this case, the austenitic stainless steel weld joint 1 is excellent in the polythionic acid corrosion resistance and the naphthenic acid corrosion resistance, is excellent in the creep ductility of its base material 10, and is further excellent in toughness of its weld metal 20 after high temperature aging.

[Producing Method]

An example of a producing method of the austenitic stainless steel weld joint 1 according to the present embodiment will be described. The example of the producing method includes a process of preparing the base material 10 (base material preparation process) and a process of welding the base material 10 to form the austenitic stainless steel weld joint 1 (welding process). The processes will be described below in detail.

[Base Material Preparation Process]

In the base material preparation process, base material 10 having the chemical composition described above satisfying Formula (1) are prepared. The base material 10 may each be a steel plate or a steel pipe, as described above. The base material 10 may be ones acquired as products from a person who performs the welding process described below or may be ones that are produced by a person who performs the welding process.

In producing the base material 10, the base material preparation process includes a preparation process of preparing starting materials, a hot working process of performing hot working on the starting materials to produce the base material 10, a cold working process of, as necessary, performing cold working on the base material 10 subjected to the hot working process, and a solution treatment process of, as necessary, performing solution treatment on the base material 10. The base material preparation process in producing the base material 10 will be described below.

[Preparation Process]

A molten steel having the above chemical composition and satisfying Formula (1) is produced. The molten steel is produced using, for example, an electric furnace, an AOD (Argon Oxygen Decarburization) furnace, or a VOD (Vacuum Oxygen Decarburization) furnace. As necessary, the produced molten steel is subjected to a well-known degassing treatment. From the molten steel subjected to the degassing treatment, a starting material is produced. Examples of the producing method for the starting material include a continuous casting process. By the continuous casting process, a continuous casting material (the starting material) is produced. The continuous casting material is, for example, a slab, a bloom, a billet, and the like. The molten steel may be subjected to an ingot-making process into an ingot.

[Hot Working Process]

The prepared starting material (the continuous casting material or the ingot) is subjected to hot working to be produced into the base material. For example, the starting material is subjected to the hot rolling to be produced into the steel plate to be the base material 10. Alternatively, the starting material is subjected to hot extrusion, hot piercing-rolling, or the like to be produced into the steel pipes to be the base material 10. A specific method of the hot working is not specially limited, and performing hot working conforming to a shape of a finished product will suffice. A finish working temperature of the hot working is, for example, 1000° C. or more, preferably 1050° C. or more. The finish working temperature used herein means a temperature of the base material 10 immediately after completion of final hot working.

[Cold Working Process]

Cold working may be performed, as necessary, on the base material subjected to the hot working process. When the base material 10 is a steel pipe, the cold working is, for example, cold drawing or cold rolling. When the base material 10 is a steel plate, the cold working is, for example, cold rolling or the like.

[Solution Treatment Process]

After the hot working process or the cold working process, solution treatment may be performed on the base material 10 as necessary. A solution treatment step involves uniformizing a structure and dissolving a carbo-nitride. A preferable solution treatment temperature is as follows.

Preferable solution treatment temperature: 1000 to 1250° C.

When the solution treatment temperature is 1000° C. or more, a carbo-nitride of Nb is dissolved sufficiently, further increasing the creep strength in use under a high-temperature corrosive environment. When the heat treatment temperature is 1250° C. or less, excessive dissolution of C can be restricted, further increasing the polythionic acid SCC resistance.

A retention duration in the solution treatment at the above solution treatment temperature is, for example but not specially limited to, 2 minutes to 60 minutes.

In place of the solution treatment, rapid cooling may be performed immediately after the hot working on the base material 10 produced through the hot working step. In this case, a finish working temperature of the hot working is preferably set at 1000° C. or more. When the finish hot working temperature is 1000° C. or more, the carbo-nitride of Nb is dissolved sufficiently, which makes it possible to obtain an excellent polythionic acid SCC resistance and an excellent creep ductility in use under a high-temperature corrosive environment at 600 to 700° C. In addition, the Nb carbo-nitride is formed in use under the high-temperature corrosive environment, which allows a sufficient creep strength to be obtained.

[Welding Process]

The prepared base materials 10 are welded to be produced into an austenitic stainless steel weld joint 1. A bevel is formed at an edge of each base material 10. Two of the base materials 10 with the formed bevels are prepared. The bevels of the prepared base materials 10 are butted together. Welding is then performed on the paired beveled portion butted together using welding material to form a weld metal 20 having the chemical composition described above. There is no specific limitation on a chemical composition of the welding material used for the welding as long as the chemical composition of the formed weld metal 20 falls within the rnges described above. Examples of a method for the welding include gas tungsten arc welding (GTAW), shielded metal arc welding (SMAW), flux cored are welding (FCAW), gas metal arc welding (GMAW), and submerged arc welding (SAW).

The welding material may be, for example, melted as with the base materials 10 described above. In this case, the melted welding material is cast to be an ingot. The ingot is subjected to hot working to be produced into the welding material. Cold working may be performed, as necessary, on the welding material subjected to the hot working. In addition, well-known heat treatment may be performed on the welding material. Examples of the heat treatment include solution treatment as with the base materials 10. The heat treatment need not be performed. The welding material may be bar-shaped or small-block shaped.

In the welding process, when the base materials 10 are steel plates, the bevels are formed, for example, on end faces or side faces of the steel plates. When the base materials 10 are steel pipes, the bevels are formed on leading ends of the pipes in an axial direction of the steel pipes. When the base materials 10 are steel pipes, for example, peripheral welding is performed to form the austenitic stainless steel weld joint 1. Note that, in the welding process, by adjusting the chemical composition of the welding material and a dilution amount of the base materials 10, the weld metal 20 that has the chemical composition described above and preferably satisfies Formula (2) can be adjusted.

Through the above producing process, the austenitic stainless steel weld joint 1 according to the present embodiment can be produced. The producing method of the austenitic stainless steel weld joint 1 according to the present embodiment is not limited to the producing method described above. The austenitic stainless steel weld joint 1 may be produced by another method as long as the austenitic stainless steel weld joint 1 including the weld metal 20 having the chemical composition described above can be produced by performing welding using the base materials 10 having the chemical composition described above and satisfying Formula (1).

EXAMPLES

[Producing Austenitic Stainless Steel Weld Joint]
[Producing Base Material]

Molten steels for base materials having chemical compositions shown in Table 1 were produced.

TABLE 1

| | Chemical composition (in mass %, balance being Fe and impurities) | | | | | | | | | | | | | | |
|---|---|---|---|---|---|---|---|---|---|---|---|---|---|---|---|
| Steel | C | Si | Mn | P | S | Cr | Ni | Mo | Nb | N | sol. Al | B | Cu | Other | F1 |
| A | 0.010 | 0.19 | 0.65 | 0.001 | 0.001 | 17.6 | 13.1 | 0.50 | 0.25 | 0.100 | 0.005 | 0.0010 | 3.20 | 0.10V | 0.00025 |
| B | 0.006 | 0.33 | 1.51 | 0.002 | 0.001 | 20.3 | 15.5 | 2.30 | 0.41 | 0.120 | 0.010 | 0.0060 | — | 0.51Co | 0.09453 |
| C | 0.011 | 0.27 | 0.68 | 0.019 | 0.001 | 17.3 | 14.2 | 0.80 | 0.41 | 0.099 | 0.010 | 0.0033 | — | — | 0.00828 |
| D | 0.008 | 0.25 | 0.69 | 0.012 | 0.001 | 17.6 | 11.3 | 0.30 | 0.35 | 0.082 | 0.005 | 0.0046 | — | — | 0.00293 |
| F | 0.009 | 0.18 | 0.65 | 0.015 | 0.010 | 17.5 | 11.2 | 0.40 | 0.29 | 0.078 | 0.008 | 0.0045 | 1.80 | — | 0.00312 |
| G | 0.017 | 0.18 | 0.77 | 0.026 | 0.001 | 17.6 | 14.2 | 1.20 | 0.32 | 0.085 | 0.003 | 0.0023 | — | — | 0.01548 |
| H | 0.015 | 0.23 | 0.65 | 0.029 | 0.001 | 17.4 | 15.2 | 1.60 | 0.31 | 0.098 | 0.008 | 0.0031 | — | — | 0.03712 |
| I | 0.007 | 0.25 | 1.05 | 0.028 | 0.001 | 17.9 | 14.8 | 0.80 | 0.35 | 0.092 | 0.009 | 0.0029 | — | 0.004Ca | 0.01148 |
| J | 0.008 | 0.19 | 1.32 | 0.031 | 0.002 | 17.6 | 13.2 | 0.40 | 0.25 | 0.110 | 0.004 | 0.0025 | — | 1.0W, 0.10Ta | 0.00202 |
| K | 0.015 | 0.39 | 1.52 | 0.018 | 0.001 | 17.5 | 14.9 | 2.30 | 0.41 | 0.120 | 0.015 | 0.0035 | — | 0.15V, 0.002Ca | 0.08393 |
| L | 0.014 | 0.33 | 0.94 | 0.019 | 0.001 | 22.7 | 16.2 | 0.90 | 0.62 | 0.180 | 0.021 | 0.0031 | 2.50 | 0.002Mg | 0.00827 |
| M | 0.011 | 0.43 | 0.56 | 0.031 | 0.002 | 16.9 | 13.6 | 3.10 | 0.27 | 0.100 | 0.026 | 0.0025 | 0.10 | 010V, 0.003Ca | 0.15997 |
| N | 0.006 | 0.42 | 0.63 | 0.021 | 0.001 | 18.2 | 14.3 | 0.30 | 0.28 | 0.092 | 0.030 | 0.0020 | 3.40 | 0.5Co | 0.00213 |
| O | 0.020 | 0.24 | 1.11 | 0.028 | 0.001 | 18.0 | 13.9 | 0.30 | 0.35 | 0.086 | 0.010 | 0.0025 | — | — | −0.00997 |
| P | 0.016 | 0.23 | 0.62 | 0.003 | 0.001 | 17.8 | 14.2 | 0.40 | 0.32 | 0.086 | 0.012 | 0.0012 | — | — | −0.00648 |
| Q | 0.065 | 0.25 | 0.85 | 0.027 | 0.001 | 18.1 | 12.9 | 1.30 | 0.42 | 0.110 | 0.007 | 0.0041 | — | — | −0.02167 |

TABLE 1-continued

| | Chemical composition (in mass %, balance being Fe and impurities) | | | | | | | | | | | | | | |
|---|---|---|---|---|---|---|---|---|---|---|---|---|---|---|---|
| Steel | C | Si | Mn | P | S | Cr | Ni | Mo | Nb | N | sol. Al | B | Cu | Other | F1 |
| R | 0.010 | 0.31 | 0.68 | 0.017 | 0.001 | 17.6 | 14.2 | 0.11 | 0.43 | 0.101 | 0.005 | 0.0033 | — | — | −0.00149 |
| S | 0.009 | 0.25 | 0.81 | 0.018 | 0.001 | 18.0 | 14.7 | 2.40 | 0.28 | 0.120 | 0.080 | 0.0005 | — | — | 0.09432 |
| T | 0.009 | 0.25 | 0.77 | 0.012 | 0.001 | 17.6 | 12.3 | 0.40 | 0.33 | 0.080 | 0.005 | 0.0100 | — | — | 0.00862 |
| U1 | 0.012 | 0.34 | 0.78 | 0.022 | 0.001 | 17.8 | 16.5 | 4.82 | 0.47 | 0.096 | 0.065 | 0.0028 | 0.10 | — | 0.39095 |
| U2 | 0.014 | 0.28 | 0.79 | 0.024 | 0.001 | 18.4 | 13.2 | 3.66 | 0.40 | 0.092 | 0.034 | 0.0033 | 0.11 | — | 0.22243 |
| U3 | 0.011 | 0.27 | 0.81 | 0.02 | 0.001 | 17.2 | 14.4 | 3.78 | 0.39 | 0.105 | 0.016 | 0.0031 | 0.14 | — | 0.24010 |
| U4 | 0.021 | 0.41 | 0.78 | 0.022 | 0.001 | 17.6 | 13.8 | 3.11 | 0.06 | 0.081 | 0.022 | 0.0032 | — | — | 0.15273 |
| U5 | 0.007 | 0.44 | 0.76 | 0.023 | 0.001 | 17.7 | 13.4 | 0.01 | 0.31 | 0.095 | 0.014 | 0.0025 | — | — | 0.00020 |

In a column "F1" of Table 1, a value of F1 of each steel is written. A symbol of an element in a column "OTHER" of a column "CHEMICAL COMPOSITION" and a numerical value preceding the symbol of the element means an optional element and its content (in mass %). For example, for a steel A, the column "Other" indicates that V was contained at 0.10% as another element. For a steel K, the column "Other" indicates that V was contained at 0.15%, and in addition, Ca was contained at 0.002%, as other elements. Of the chemical composition of each steel, the balance, all but elements shown in Table 1, was Fe and impurities. Note that signs "–" seen in Table 1 each mean that an element corresponding thereto was not contained (was less than a detection limit of the element).

The molten steels were used to produce ingots each having an outer diameter of 120 mm and weighing 30 kg. The ingots were subjected to hot forging to be formed into steel plates each having a thickness of 40 mm. The steel plates were further subjected to the hot rolling into steel plates each having a thickness of 15 mm Final working temperatures of the hot rolling was 1050° C. or more for all test numbers. The steel plates subjected to the hot rolling were each subjected to the solution treatment. For all of the steel plates, the solution treatment temperature was 1150° C., and a solution treatment duration was 10 minutes. The base materials subjected to the solution treatment were subjected to water cooling. Through the above producing processes, the steel plates (base materials) each having a thickness of 15 mm, a width of 50 mm, and a length of 100 mm were produced.

[Producing Welding Material]

Molten steels having chemical compositions of steels V to Z shown in Table 2 were produced. Of the chemical composition of each steel, the balance, all but elements shown in Table 2, was Fe and impurities. Note that signs "–" seen in Table 2 each mean that an element corresponding thereto was not contained (was less than a detection limit of the element).

be produced into a welding wire (welding material) having an outer diameter of 1.2 mm.

[Producing Austenitic Stainless Steel Weld Joint]

Figure 6:
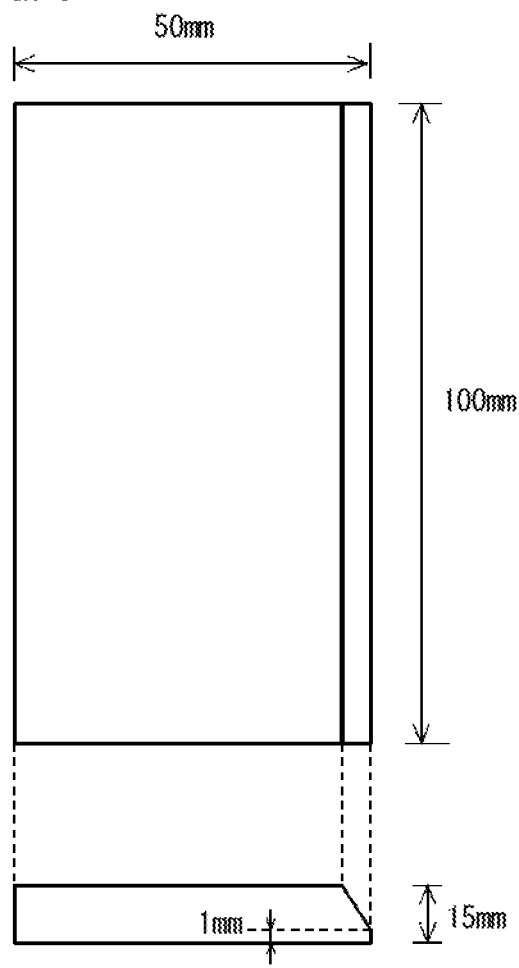
FIG. 6 is a schematic diagram used for describing a bevel shape of a base material in EXAMPLE.

From the base material made of each of the steels shown in Table 1, two plate materials illustrated in FIG. 6 were fabricated by machining. In FIG. 6, numeric values with "mm" indicate dimensions (in units of mm) of each steel plate being the base material. The steel plates had bevel faces on their side faces extending in their longitudinal direction. Each of the bevel faces was a V-type groove surface having a groove angle of 30° and a root thickness of 1 mm.

Figure 7:
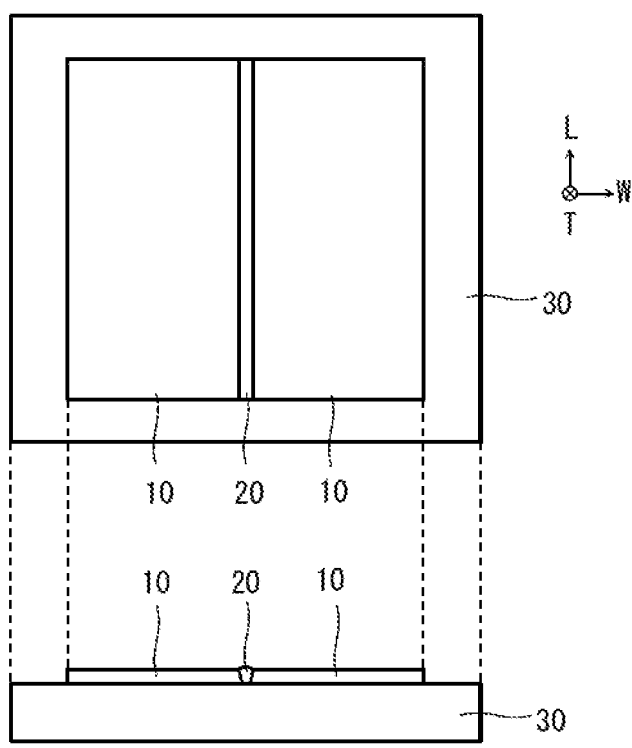
FIG. 7 is a schematic diagram of a weld joint using base materials each illustrated in FIG. 6.

As illustrated in FIG. 7, a restraint plate 30 was prepared. The restraint plate 30 had a thickness of 25 nm, a width of 200 mm, and a length of 200 mm, and had a chemical composition equivalent to that of "SM400C" described in JIS G 3106(2008).

On the restraint plate 30, the two base materials (plate materials) 10 were disposed. At this time, bevel faces of the two base materials 10 are butted together. After the two base materials 10 were disposed, four sides of each base material 10 were subjected to restraint-weld using a covered electrode. The covered electrode had a chemical composition equivalent to that of "ENiCrMo-3" specified in JIS Z 3224(2010).

After the restraint-weld of the four sides of the base materials 10, multi-layer welding was performed using welding wires having chemical compositions shown in Table 2. Specifically, the gas tungsten arc welding (GTAW) was performed. In each time of the welding, its heat input was adjusted to 6 to 18 kJ/cm. In performing the gas tungsten arc welding (GTAW), 100%-Ar gas was used as shielding gas.

By the welding described above, austenitic stainless steel weld joints each including the base materials 10 and the weld metal 20 were produced. Chemical compositions of the weld metals 20 of the weld joints at the width-center position

TABLE 2

| | Chemical composition (in mass %, balance being Fe and impurities) | | | | | | | | | | | | | | |
|---|---|---|---|---|---|---|---|---|---|---|---|---|---|---|---|
| Steel | C | Si | Mn | P | S | Cr | Ni | Mo | Nb | N | B | Al | Cu | Co | Ti |
| V | 0.050 | 0.11 | 2.00 | 0.003 | 0.007 | 17.0 | 37.0 | 3.00 | — | 0.100 | 0.0050 | — | — | — | — |
| W | 0.060 | 0.20 | 0.06 | 0.003 | 0.007 | 22.0 | 54.9 | 9.10 | — | 0.100 | — | 0.980 | 0.07 | 12.5 | 0.44 |
| X | 0.010 | 0.02 | 0.01 | 0.003 | 0.007 | 22.1 | 65.3 | 8.90 | 3.36 | 0.110 | — | 0.200 | 0.01 | — | 0.29 |
| Y | 0.030 | 0.12 | 3.01 | 0.003 | 0.007 | 19.9 | 71.9 | — | — | 0.100 | — | — | 0.03 | — | 0.33 |
| Z | 0.024 | 0.36 | 1.80 | 0.003 | 0.007 | 19.3 | 13.6 | 3.70 | — | 0.100 | — | — | — | — | — |

The molten steels were used to produce ingots each having an outer diameter of 120 mm and weighing 30 kg. The ingots were subjected to hot forging and hot rolling, cold rolling, and heat treatment by well-known methods to and at the thickness-center position were analyzed. The chemical compositions of the weld metals 20 at the width-center position and at the thickness-center position are shown in Table 3.

TABLE 3

| Test number | Base material | Welding material | Weld metal Chemical composition (in mass %, balance being Fe and impurities) | | | | | | | |
|---|---|---|---|---|---|---|---|---|---|---|
| | | | C | Si | Mn | P | S | Cr | Ni | Mo |
| 1 | A | V | 0.034 | 0.14 | 1.46 | 0.002 | 0.005 | 17.2 | 27.4 | 2.50 |
| 2 | A | W | 0.050 | 0.20 | 0.18 | 0.003 | 0.006 | 21.1 | 46.5 | 7.38 |
| 3 | A | X | 0.012 | 0.09 | 0.27 | 0.002 | 0.005 | 20.3 | 44.4 | 5.53 |
| 4 | B | W | 0.049 | 0.23 | 0.35 | 0.003 | 0.006 | 21.7 | 47.0 | 7.74 |
| 5 | B | X | 0.012 | 0.08 | 0.31 | 0.002 | 0.006 | 22.2 | 55.3 | 7.56 |
| 6 | C | V | 0.027 | 0.21 | 1.21 | 0.013 | 0.003 | 17.2 | 23.3 | 1.68 |
| 7 | C | W | 0.031 | 0.24 | 0.43 | 0.013 | 0.003 | 19.2 | 30.5 | 4.12 |
| 8 | C | X | 0.011 | 0.17 | 0.41 | 0.013 | 0.003 | 19.2 | 34.6 | 4.04 |
| 9 | D | V | 0.025 | 0.19 | 1.21 | 0.008 | 0.003 | 17.4 | 21.6 | 1.38 |
| 10 | F | V | 0.025 | 0.15 | 1.19 | 0.010 | 0.009 | 17.3 | 21.5 | 1.44 |
| 11 | G | V | 0.030 | 0.15 | 1.26 | 0.017 | 0.003 | 17.4 | 23.3 | 1.92 |
| 12 | H | V | 0.029 | 0.18 | 1.19 | 0.019 | 0.003 | 17.2 | 23.9 | 2.16 |
| 13 | I | V | 0.024 | 0.19 | 1.43 | 0.018 | 0.003 | 17.5 | 23.7 | 1.68 |
| 14 | J | V | 0.025 | 0.16 | 1.59 | 0.020 | 0.004 | 17.4 | 22.7 | 1.44 |
| 15 | K | V | 0.029 | 0.28 | 1.71 | 0.012 | 0.003 | 17.3 | 23.7 | 2.58 |
| 16 | L | V | 0.028 | 0.24 | 1.36 | 0.013 | 0.003 | 20.4 | 24.5 | 1.74 |
| 17 | M | V | 0.027 | 0.30 | 1.14 | 0.020 | 0.004 | 16.9 | 23.0 | 3.06 |
| 18 | N | V | 0.024 | 0.30 | 1.18 | 0.014 | 0.003 | 17.7 | 23.4 | 1.38 |
| 19 | U1 | V | 0.033 | 0.21 | 1.46 | 0.011 | 0.004 | 17.35 | 28.0 | 3.80 |
| 20 | U2 | W | 0.035 | 0.24 | 0.46 | 0.015 | 0.004 | 20.02 | 32.0 | 6.11 |
| 21 | U3 | X | 0.010 | 0.10 | 0.27 | 0.008 | 0.005 | 20.53 | 49.0 | 7.26 |
| 22 | U1 | V | 0.019 | 0.30 | 1.00 | 0.019 | 0.002 | 17.66 | 20.2 | 4.49 |
| 23 | U2 | W | 0.024 | 0.26 | 0.63 | 0.019 | 0.002 | 19.19 | 22.4 | 4.86 |
| 24 | U3 | X | 0.011 | 0.23 | 0.69 | 0.017 | 0.002 | 17.94 | 22.0 | 4.55 |
| 25 | A | Z | 0.023 | 0.35 | 1.71 | 0.003 | 0.007 | 19.2 | 13.6 | 3.44 |
| 26 | B | V | 0.032 | 0.20 | 1.80 | 0.003 | 0.005 | 18.3 | 28.4 | 2.72 |
| 27 | B | Y | 0.019 | 0.22 | 2.32 | 0.003 | 0.004 | 20.1 | 46.0 | 1.06 |
| 28 | B | Z | 0.023 | 0.36 | 1.79 | 0.003 | 0.007 | 19.4 | 13.7 | 3.63 |
| 29 | C | Y | 0.018 | 0.21 | 1.57 | 0.013 | 0.003 | 18.3 | 36.1 | 0.50 |
| 30 | C | Z | 0.023 | 0.35 | 1.73 | 0.004 | 0.007 | 19.2 | 13.6 | 3.53 |
| 31 | O* | V | 0.032 | 0.19 | 1.47 | 0.018 | 0.003 | 17.6 | 23.1 | 1.38 |
| 32 | P* | V | 0.030 | 0.18 | 1.17 | 0.003 | 0.003 | 17.5 | 23.3 | 1.44 |
| 33 | Q* | V | 0.053 | 0.14 | 1.75 | 0.008 | 0.006 | 17.2 | 31.7 | 2.63 |
| 34 | R* | Y | 0.014 | 0.27 | 1.19 | 0.014 | 0.002 | 18.1 | 26.9 | 0.09 |
| 35 | S* | V | 0.030 | 0.25 | 1.28 | 0.012 | 0.003 | 17.5 | 23.6 | 2.64 |
| 36 | T* | V | 0.025 | 0.19 | 1.26 | 0.008 | 0.003 | 17.4 | 22.2 | 1.44 |
| 37 | U4* | X | 0.016 | 0.24 | 0.43 | 0.014 | 0.004 | 19.6 | 37.0 | 5.72 |
| 38 | U5* | X | 0.009 | 0.21 | 0.36 | 0.012 | 0.004 | 20.1 | 41.4 | 4.81 |

| Test number | Weld metal Chemical composition (in mass %, balance being Fe and impurities | | | | | | | | |
|---|---|---|---|---|---|---|---|---|---|
| | Nb | N | B | Al | Cu | Ti | Co | Other | F2 |
| 1 | 0.10 | 0.100 | 0.0034 | — | 1.28 | — | — | 0.04V | 0.104 |
| 2 | 0.05 | 0.100 | 0.0002 | 0.785 | 0.70 | 0.35 | 7.5 | 0.02V | 0.104 |
| 3 | 2.12 | 0.100 | 0.0004 | 0.122 | 1.29 | 0.17 | — | 0.04V | 0.144 |
| 4 | 0.08 | 0.100 | 0.0012 | 0.786 | 0.06 | 0.35 | 10.1 | — | 0.103 |
| 5 | 2.77 | 0.100 | 0.0010 | 0.162 | — | 0.23 | 0.1 | — | 0.155 |
| 6 | 0.25 | 0.099 | 0.0040 | 0.006 | — | — | — | — | 0.117 |
| 7 | 0.25 | 0.099 | 0.0020 | 0.398 | 0.03 | 0.18 | 5.0 | — | 0.125 |
| 8 | 1.59 | 0.103 | 0.0020 | 0.086 | — | 0.12 | — | — | 0.148 |
| 9 | 0.21 | 0.089 | 0.0048 | 0.003 | — | — | — | — | 0.123 |
| 10 | 0.17 | 0.087 | 0.0047 | 0.005 | 1.08 | — | — | — | 0.123 |
| 11 | 0.19 | 0.091 | 0.0034 | 0.002 | — | — | — | — | 0.121 |
| 12 | 0.19 | 0.099 | 0.0039 | 0.005 | — | — | — | — | 0.120 |
| 13 | 0.21 | 0.095 | 0.0037 | 0.005 | — | — | — | 0.002Ca | 0.119 |
| 14 | 0.15 | 0.106 | 0.0035 | 0.002 | — | — | — | 0.6W, 0.06TA | 0.117 |
| 15 | 0.25 | 0.112 | 0.0041 | 0.009 | — | — | — | 0.09V, 0.001Ca | 0.128 |
| 16 | 0.37 | 0.148 | 0.0039 | 0.013 | 1.50 | — | — | 0.001Mg | 0.154 |
| 17 | 0.16 | 0.100 | 0.0035 | 0.016 | 0.06 | — | — | 0.06V, 0.002Ca | 0.132 |
| 18 | 0.17 | 0.095 | 0.0032 | 0.018 | 2.04 | — | 0.3 | — | 0.117 |
| 19 | 0.21 | 0.098 | 0.0040 | 0.029 | 0.04 | — | — | — | 0.123 |
| 20 | 0.22 | 0.096 | 0.0018 | 0.460 | 0.09 | 0.20 | 5.6 | — | 0.152 |
| 21 | 2.41 | 0.108 | 0.0010 | 0.141 | 0.05 | 0.20 | — | — | 0.154 |
| 22 | 0.39 | 0.097 | 0.0032 | 0.053 | 0.08 | — | — | — | 0.179 |
| 23 | 0.31 | 0.094 | 0.0026 | 0.242 | 0.10 | 0.10 | 2.8 | — | 0.183 |
| 24 | 0.84 | 0.106 | 0.0026 | 0.044 | 0.12 | 0.03 | — | — | 0.184 |
| 25 | 0.02 | 0.100 | 0.0001 | — | 0.26 | — | — | 0.01V | — |
| 26 | 0.16 | 0.100 | 0.0054 | — | — | — | 0.2 | — | — |
| 27 | 0.19 | 0.109 | 0.0028 | — | 0.02 | 0.20 | 0.2 | — | — |
| 28 | 0.02 | 0.101 | 0.0003 | 0.007 | — | — | 0.1 | — | — |
| 29 | 0.25 | 0.099 | 0.0020 | 0.006 | 0.01 | 0.13 | — | — | — |
| 30 | 0.02 | 0.100 | 0.0002 | — | — | — | — | — | — |
| 31 | 0.21 | 0.092 | 0.0035 | 0.006 | — | — | — | — | — |

TABLE 3-continued

| | | | | | | | | | |
|---|---|---|---|---|---|---|---|---|---|
| 32 | 0.19 | 0.092 | 0.0027 | 0.007 | — | — | — | — | — |
| 33 | 0.09 | 0.102 | 0.0048 | 0.002 | — | — | — | — | — |
| 34 | 0.34 | 0.101 | 0.0026 | — | 0.02 | 0.07 | — | — | — |
| 35 | 0.17 | 0.106 | 0.0032 | 0.048 | — | — | — | — | — |
| 36 | 0.20 | 0.088 | 0.0080 | 0.003 | — | — | 0.3 | — | — |
| 37 | 1.55 | 0.094 | 0.0018 | 0.102 | 0.0045 | 0.131 | — | — | 0.163 |
| 38 | 1.96 | 0.103 | 0.0012 | 0.114 | 0.0054 | 0.157 | — | — | 0.144 |

In a column "F2" of Table 3, a value of F2 of a weld metal of each test number is written. A symbol of an element in a column "Other" of a column "Chemical composition" and a numerical value preceding the symbol of the element means an optional element and its content (in mass %). For example, for a test number 1, the column "Other" indicates that V was contained at 0.04% as another element. For a test number 15, the column "Other" indicates that W was contained at 0.6%, and in addition, Ta was contained at 0.06%, as other elements. Of the chemical composition of each steel, the balance, all but elements shown in Table 3, was Fe and impurities. Note that signs "–" seen in Table 3 each mean that an element corresponding thereto was not contained (was less than a detection limit of the element).

[Evaluation Test]

The austenitic stainless steel weld joints of the respective test numbers were subjected to the following evaluation test.

[Weldability Evaluation Test]

From a portion of the weld metal of the weld joint of each test number shown in Table 3, ten test specimens for observing its cross-section microstructure, which is perpendicular to its weld line, were taken. Surfaces of the test specimens taken were subjected to mirror polish and etched. The etched surfaces of the test specimens were observed under an optical microscope with 200× magnification. On the cross sections whether hot cracking occurred in the weld metals was visually determined. A column "Weldability" in Table 4 shows test results. In the column "Weldability" in Table 4, the marks "○" each indicate that no cracking occurred in the weld metal in the ten test specimens. The marks "x" each indicate that the cracking occurred in the weld metal in one or more of the ten test specimens.

TABLE 4

| | Base material | | | Weld Metal | | | | | |
|---|---|---|---|---|---|---|---|---|---|
| Test number | Polythionic acid SCC resistance | Naphthenic acid corrosion resistance | Creep ductility | Weldability | Polythionic acid SCC resistance | Naphthenic acid corrosion resistance | Toughness after high temperature aging | Weld joint Creep strength | Remarks |
| 1 | ○ | ○ | ○ | ○ | ○ | ○ | ○ | ⊚ | Inventive |
| 2 | ○ | ○ | ○ | ○ | ○ | ○ | ○ | ○ | Inventive |
| 3 | ○ | ○ | ○ | ○ | ○ | ○ | ○ | ○ | Inventive |
| 4 | ○ | ○ | ⊚ | ○ | ○ | ○ | ○ | ○ | Inventive |
| 5 | ○ | ○ | ⊚ | ○ | ○ | ○ | ○ | ○ | Inventive |
| 6 | ○ | ○ | ○ | ○ | ○ | ○ | ○ | ⊚ | Inventive |
| 7 | ○ | ○ | ○ | ○ | ○ | ○ | ○ | ○ | Inventive |
| 8 | ○ | ○ | ○ | ○ | ○ | ○ | ○ | ○ | Inventive |
| 9 | ○ | ○ | ○ | ○ | ○ | ○ | ○ | ⊚ | Inventive |
| 10 | ○ | ○ | ○ | ○ | ○ | ○ | ○ | ⊚ | Inventive |
| 11 | ○ | ○ | ⊚ | ○ | ○ | ○ | ○ | ⊚ | Inventive |
| 12 | ○ | ○ | ⊚ | ○ | ○ | ○ | ○ | ⊚ | Inventive |
| 13 | ○ | ○ | ○ | ○ | ○ | ○ | ○ | ⊚ | Inventive |
| 14 | ○ | ○ | P | ○ | ○ | ○ | ○ | ⊚ | Inventive |
| 15 | ○ | ○ | ⊚ | ○ | ○ | ○ | ○ | ⊚ | Inventive |
| 16 | ○ | ○ | ○ | ○ | ○ | ○ | ○ | ⊚ | Inventive |
| 17 | ○ | ○ | ⊚ | ○ | ○ | ○ | ○ | ⊚ | Inventive |
| 18 | ○ | ○ | P | ○ | ○ | ○ | ○ | ⊚ | Inventive |
| 19 | ○ | ○ | ⊚ | ○ | ○ | ○ | ○ | ⊚ | Inventive |
| 20 | ○ | ○ | ⊚ | ○ | ○ | ○ | ○ | ○ | Inventive |
| 21 | ○ | ○ | ⊚ | ○ | ○ | ○ | ○ | ○ | Inventive |
| 22 | ○ | ○ | ⊚ | ○ | ○ | ○ | X | ⊚ | Inventive |
| 23 | ○ | ○ | ⊚ | ○ | ○ | ○ | X | ○ | Inventive |
| 24 | ○ | ○ | ⊚ | ○ | ○ | ○ | X | ○ | Inventive |
| 25 | ○ | ○ | ○ | ○ | X | ○ | — | ○ | Comparative |
| 26 | ○ | ○ | ⊚ | X | — | — | — | — | Comparative |
| 27 | ○ | ○ | ⊚ | ○ | ○ | X | — | ○ | Comparative |
| 28 | ○ | ○ | ⊚ | ○ | X | ○ | — | ○ | Comparative |
| 29 | ○ | ○ | ○ | ○ | ○ | X | — | ○ | Comparative |
| 30 | ○ | ○ | ○ | ○ | X | ○ | — | ○ | Comparative |
| 31 | ○ | ○ | X | ○ | ○ | ○ | — | ⊚ | Comparative |
| 32 | ○ | ○ | X | ○ | ○ | ○ | — | ○ | Comparative |
| 33 | X | ○ | X | ○ | X | ○ | — | ⊚ | Comparative |
| 34 | ○ | ○ | X | ○ | ○ | X | — | ⊚ | Comparative |
| 35 | ○ | ○ | X | ○ | ○ | ○ | — | ⊚ | Comparative |
| 36 | ○ | ○ | — | X | — | — | — | — | Comparative |
| 37 | X | ○ | ⊚ | ○ | ○ | ○ | ○ | ○ | Comparative |
| 38 | ○ | X | ○ | ○ | ○ | ○ | ○ | ○ | Comparative |

[Evaluation Test for Polythionic Acid SCC Resistance of Weld Metal]

Figure 8:
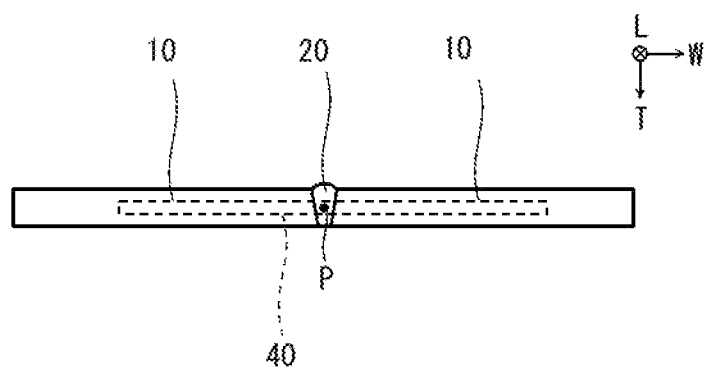
FIG. 8 is a schematic diagram illustrating an extracting position for a plate specimen used in EXAMPLE.

Weld joints in which no cracking occurred in the weldability evaluation test described above were subjected to a 5000-hour aging treatment at 600° C. on the assumption that they are used under the high temperature environment. From the weld joints subjected to the aging treatment, plate specimens 40 each including the region P and having a thickness of 2 mm, a width of 10 mm, and a length of 75 mm were fabricated, as illustrated in FIG. 8. The thickness 2 mm of the specimens 40 was equivalent to the length in the weld metal thickness direction T, the length 75 mm of the test specimens 40 was equivalent to the length in the weld metal width direction W and the width 10 mm of the test specimens 40 was equivalent to the length in the weld metal extending direction L. Each of the plate specimens was fabricated such that the region P of its weld metal 20 was positioned at the center position of the length 75 mm. An evaluation test for polythionic acid SCC resistance was conducted conforming to "Stress corrosion cracking test in chloride solution for stainless steels" in JIS G 0576(2001). Specifically, each test specimen was bent around a punch having an inside radius of 5 mm to have a U-bend shape (its curved portion corresponded to the weld metal). The test specimen with the U-bend shape was immersed in Wackenroder solution (solution made by blowing a large quantity of $H_2S$ gas into $H_2SO_3$ saturated aqueous solution that is made by blowing $SO_2$ gas into distilled water) at normal temperature for 100 hours. The immersed test specimen was subjected to microscopic observation at 500× magnification to check for cracking in the weld metal portion of the test specimen.

When no cracking was found in a test specimen, the test specimen was determined to be excellent in polythionic acid SCC resistance of the weld metal (marked as "○" in a column "Polythionic acid SCC resistance" of a column "Weld metal" in Table 4). When any crack was found in the weld metal, the test specimen was determined to be low in polythionic acid SCC resistance of the weld metal (marked as "x" in the column "Polythionic acid SCC resistance" of the column "Weld metal" in Table 4).

[Evaluation Test for Naphthenic Acid Corrosion Resistance of Weld Metal]

From the austenitic stainless steel weld joints in which no cracking occurred in the weldability evaluation test described above, weld metal samples each including the region P were taken. Each of the weld metal samples included no base material.

In an autoclave, the weld metal samples were immersed in inferior-grade crude oil at 135 MPa and 350° C. in a nitrogen atmosphere for 48 hours. The inferior-grade crude oil was equivalent to Total Acid Number 6 specified in ASTM D664-11a. After a lapse of 48 hours, the weld metal samples were taken out. Note that, as the corrosion test proceeds, acid contained in the inferior-grade crude oil is consumed to decrease a value of the TAN (value of total acid number); therefore, after 24 hours from immersing the corrosion test specimens, the inferior-grade crude oil was totally replaced with new one using an outlet and an inlet of the autoclave, and thus the immersion was performed for 48 hours in total.

After the lapse of 48 hours, soot firmly adhered to the weld metal samples taken out from the autoclave. Hence, the weld metal samples were subjected to blasting treatment using alumina for 5 seconds, and then the plate specimens were pickled in ammonium citrate solution in conditions of 100° C. and 60 minutes. Thereafter, the weld metal samples were subjected to ultrasonic cleaning using acetone for 3 minutes.

Differences between masses of the weld metal samples before the test and masses of the weld metal samples after the ultrasonic cleaning were calculated as corrosion losses. In addition, from surface areas and specific gravities of the plate specimens, and a time of the test, corrosion rates (mm/y) were determined.

When a corrosion rate of a test specimen was 1.50 mm/y or less, the test specimen was determined to be excellent in naphthenic acid corrosion resistance of the weld metal (marked as "○" in a column "Naphthenic acid corrosion resistance" of the column "Weld metal" in Table 4). In contrast, when a corrosion rate of a test specimen was more than 1.50 mm/y, the test specimen was determined to be low in naphthenic acid corrosion resistance of the weld metal (marked as "x" in the column "Naphthenic acid corrosion resistance" of the column "Weld metal" in Table 4).

[Test for Creep Strength of Weld Joint]

From the weld joints in which no cracking occurred in the weldability evaluation test described above, creep rupture test specimens conforming to JIS Z2271(2010) were fabricated. Across section of each of the creep rupture test specimens perpendicular to its axial direction was in a round shape, and the creep rupture test specimen had an outer diameter of 6 mm and a parallel portion measuring 30 mm. In each creep rupture test specimen, an axial direction of its parallel portion was weld metal width direction W of the weld metal 20 illustrated in FIG. 8, and the weld metal 20 including the region P was positioned at a center position of the parallel portion.

The fabricated creep rupture test specimen was used to conduct a creep rupture test conforming to JIS Z2271(2010). Specifically, the creep rupture test specimen was heated at 750° C. and then subjected to the creep rupture test. A test stress was set at 45 MPa, and a creep rupture time (hour) was determined.

As to the creep strength, when a creep rupture time of a test specimen was 10000 hours or more, the test specimen was determined to be markedly excellent in creep strength of the weld joint (marked as "⊚" in a column "Creep strength" of a column "Weld joint" in Table 4). When a creep rupture time of a test specimen was 3000 hours or more to less than 10000 hours, the test specimen was determined to be excellent in creep strength of the weld joint (marked as "O" in the column "Creep strength" of the column "Weld joint" in Table 4). When a creep rupture time of a test specimen was less than 3000 hours, the test specimen was determined to be low in creep strength of the weld joint (marked as "x" in the column "Creep strength" of the column "Weld joint" in Table 4). When a test specimen was marked as "○" or "⊚" in creep strength, it was determined that a sufficient creep strength was obtained with the weldjoint.

[Evaluation Test for Polythionic Acid SCC Resistance of Base Material]

The base materials (steel plates) of the respective test numbers were subjected to a 5000-hour aging treatment at 600° C. on the assumption that they are used under the high temperature environment. From these aging-treated materials, plate-shaped test specimens were taken, the test specimens each having a thickness of 2 mm, a width of 10 mm, and a length of 75 mm. An evaluation test for polythionic acid SCC resistance was conducted conforming to "Stress corrosion cracking test in chloride solution for stainless steels" in JIS G 0576(2001). Specifically, each test specimen was bended around a punch having an inside radius of 5 nm to have a U-bend shape. The test specimen with the U-bend shape was immersed in Wackenroder solution (solution made by blowing a large quantity of $H_2S$ gas into $H_2SO_3$ saturated aqueous solution that is made by blowing $SO_2$ gas into distilled water) at normal temperature for 100 hours. The immersed test specimen was subjected to microscopic observation at 500× magnification to check for a crack.

When no cracking was found in a test specimen, the test specimen was determined to be excellent in polythionic acid SCC resistance of the base materials (marked as "O" in a column "Polythionic acid SCC resistance" of a column "Base material" in Table 4). When any crack was found in a test specimen, the test specimen was determined to be low in polythionic acid SCC resistance of the base materials (marked as "x" in the column "Polythionic acid SCC resistance" of the column "Base material" in Table 4).

[Evaluation Test for Naphthenic Acid Corrosion Resistance of Base Material]

From base materials (steel plates) of the respective test numbers, base material samples being 3 mm×25 mm×25 mm were taken. The base material samples included no weld metal.

Using an autoclave, the base material samples were immersed in inferior-grade crude oil at 135 MPa and 350° C. in a nitrogen atmosphere for 48 hours. The inferior-grade crude oil was equivalent to Total Acid Number 6 specified in ASTM D664-11a. After a lapse of 48 hours, the base material samples were taken out. Note that, as the corrosion test proceeds, acid contained in the inferior-grade crude oil is consumed to decrease a value of the TAN (value of total acid number); therefore, after 24 hours from immersing the corrosion test specimens, the inferior-grade crude oil was totally replaced with new one using an outlet and an inlet of the autoclave, and thus the immersion was performed for 48 hours in total.

After the lapse of 48 hours, soot firmly adhered to the base material samples taken out from the autoclave. Hence, the base material samples were subjected to blasting treatment using alumina for 5 seconds, and then the base material samples were pickled in ammonium citrate solution in conditions of 100° C. and 60 minutes. Thereafter, the weld metal samples were subjected to ultrasonic cleaning using acetone for 3 minutes.

Differences between masses of the base material samples before the test and masses of the base material samples after the ultrasonic cleaning were calculated as corrosion losses. In addition, from surface areas and specific gravities of the base material samples, and a time of the test, corrosion rates (mm/y) were determined.

When a corrosion rate of a test specimen was 1.50 mm/y or less, the test specimen was determined to be excellent in naphthenic acid corrosion resistance of the base material (marked as "0" in a column "Naphthenic acid corrosion resistance" of the column "Base material" in Table 4). In contrast, when a corrosion rate of a test specimen was more than 1.50 mm/y, the test specimen was determined to be low in naphthenic acid corrosion resistance of the base material (marked as "x" in the column "Naphthenic acid corrosion resistance" of the column "Base material" in Table 4).

[Test for Creep Ductility of Base Material]

From a base material of a weld joint of each test number (steels A to U5 shown in Table 1), a creep rupture test specimen conforming to JIS Z2271(2010) was fabricated. A cross section of the creep rupture test specimen perpendicular to its axial direction was in a round shape, and the creep rupture test specimen had an outer diameter of 6 mm and a parallel portion measuring 30 mm.

The fabricated creep rupture test specimen was used to conduct a creep rupture test conforming to JIS Z2271(2010). Specifically, the creep rupture test specimen was heated at 750C and then subjected to the creep rupture test. A test stress was set at 45 MPa, and a percentage reduction of area after creep rupture (%) was determined.

When a percentage reduction of area after creep rupture of a test specimen was 20.0% or more to 30.0% or less, the test specimen was determined to be good in creep ductility of the base material (marked as "P" in a column "Creep ductility" of the column "Base material" in Table 4). When a percentage reduction of area after creep rupture of a test specimen was more than 30.0% to 50.0% or less, the test specimen was determined to be excellent in creep ductility of the base material (marked as "O" in the column "Creep ductility" of the column "Base material" in Table 4). When a percentage reduction of area after creep rupture of a test specimen was more than 50.0%, the test specimen was determined to be markedly excellent in creep ductility of the base material (marked as "@" (Excellent) in the column "Creep ductility" of the column "Base material" in Table 4). When a percentage reduction of area after creep rupture of a test specimen was less than 20.0%, the test specimen was determined to be low in creep ductility of the base material (marked as "x" in the column "Creep ductility" of the column "Base material" in Table 4). When a test specimen was marked as "P," "O", or "O" in percentage reduction of area after creep rupture, it was determined that a sufficient creep ductility was obtained with the base material.

[Evaluation Test for Toughness after High Temperature Aging]

Figure 9:
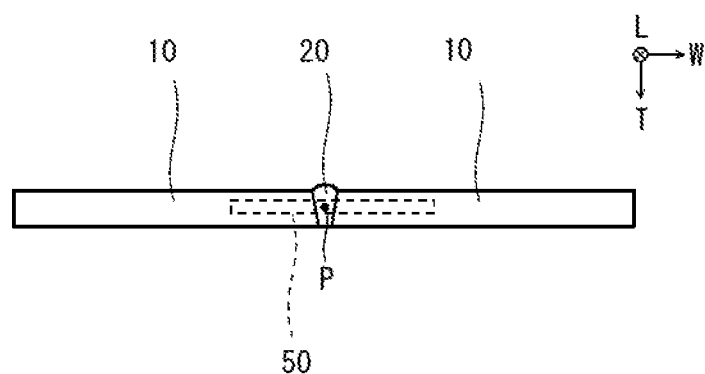
FIG. 9 is a schematic diagram illustrating an extracting position for a V notch specimen used in EXAMPLE.

From a position illustrated in FIG. 9, a V notch specimen 50 including the region P was fabricated. The specimen 50 was fabricated to have a width of 10 mm, a thickness of 10 mm, and a length of 55 mm. Each of the specimens 50 was fabricated such that the region P of its weld metal 20 was positioned at its length-center position. A V notch was formed at the length-center position of the specimen 50. A V notch angle was 45°, a notch depth was 2 mm, and a notch root radius was 0.25 mm. For each test number, three V notch specimens 50 were fabricated. The specimens 50 were subjected to aging treatment in which the specimens 50 were held at 700° C. for 3000 hours. After being held for 3000 hours, the specimens were subjected to allowing cooling. The specimens subjected to the aging treatment were subjected to the Charpy impact test in conformity with JIS Z 2242(2005) at normal temperature in the atmosphere. An arithmetic mean value of three impact values ($J/cm^2$) obtained from the test was defined as a post-high-temperature-aging impact value ($J/cm^2$) of the test number.

When an obtained impact value of a test specimen was 20 $J/cm^2$ or more, the test specimen was determined to be high in toughness of the weld metal even after the high temperature aging (marked as "O" in a column "Post-high-temperature-aging toughness" of the column "Weld metal" in Table 4). In contrast, when an obtained impact value of a test specimen was less than 20 $J/cm^2$, the test specimen was determined to be low in toughness of the weld metal after the high temperature aging (marked as "x" in the column "Post-high-temperature-aging toughness" of the column "Weld metal" in Table 4).

[Test Results]

Table 4 shows test results. Note that the signs "−" seen in Table 4 each indicate that the test was not performed. As to test numbers 1 to 24, chemical compositions of their base materials were appropriate and satisfied Formula (1). In addition, chemical compositions of their weld metals were appropriate. Therefore, no cracking was checked in their weld metals in the weldability evaluation test, and they showed excellent weldabilities. In addition, the weld metals were excellent in polythionic acid SCC resistance and naphthenic acid corrosion resistance. In addition, creep strengths of their weld joints were also high. In addition, the base materials of these test numbers were excellent in polythionic acid SCC resistance and naphthenic acid corrosion resistance. In addition, creep ductilities of the base materials were all good.

In particular, as to the test numbers 1, 6, 9 to 19, and 22, contents of B in their weld metals were 0.0030% or more. Therefore, particularly excellent creep strengths were obtained with their weld joints (marked as "☉" in a column "Creep strength" of a column "Weld joint" in Table 4).

As to the test numbers 4, 5, 11, 12, 15, 17, and 19 to 24, in chemical compositions of their base materials, contents of Mo were 1.00% or more, and contents of Cu were 1.7% or less. Therefore, particularly excellent creep ductilities were obtained with their base materials (marked as "☉" in a column "Creep ductility" of the column "Base material" in Table 4).

In addition, as to the test numbers 1 to 21, the chemical compositions of their weld metals made F2 satisfy Formula (2). Therefore, the test numbers 1 to 21 were additionally excellent in toughness after the high temperature aging as compared with test numbers 22 to 24, of which chemical compositions of the weld metals did not make F2 satisfy Formula (2).

In contrast, as to test numbers 25, 28, and 30, a welding material Z shown in Table 2 was low in its content of Ni and did not contain Nb, and thus contents of Ni and contents of Nb of their weld metals were excessively low. As a result, polythionic acid SCC resistances of their weld metals were low.

As to a test number 26, a content of B in a chemical composition of its weld metal was excessively high. Therefore, cracking was checked in their weld metals in the weldability evaluation test, and they showed low weldabilities of their weld metals.

As to test numbers 27 and 29, a content of Mo in a chemical composition of its weld metal was excessively low. As a result, naphthenic acid corrosion resistances of their weld metals were low.

As to test numbers 31 and 32, chemical compositions of their base materials did not make F1 satisfy Formula (1). As a result, creep ductilities of their base materials were low.

As to a test number 33, a content of C in its weld metal was excessively high. As a result, polythionic acid SCC resistances of their weld metals were low. In addition, a content of C of its base material was high, and thus polythionic acid SCC resistance of its base material was low. In addition. F1 of its base material failed to satisfy Formula (1). As a result, creep ductility of its base material was low.

As to a test number 34, a content of Mo of its weld metal was excessively low. As a result, naphthenic acid corrosion resistances of their weld metals were low. In addition, a chemical composition of its base material did not make F1 satisfy Formula (1). As a result, creep ductilities of their base materials were low.

As to a test number 35, a content of B of its base material was excessively low. As a result, creep ductility of its base material was excessively low.

As to a test number 36, a content of B of its base material was excessively high, and as a result, a content of B of its weld metal was excessively high. Therefore, cracking was checked in their weld metals in the weldability evaluation test, and they showed low weldabilities of their weld metals.

As to a test number 37, a content of Nb of its base material was excessively low. As a result, polythionic acid SCC resistance of the base material was low.

As to a test number 38, a content of Mo of its base material was excessively low. As a result, naphthenic acid corrosion resistance of the base material was low.

The embodiment according to the present invention has been described above. However, the aforementioned embodiment is merely an example for practicing the present invention. Therefore, the present invention is not limited to the aforementioned embodiment, and the aforementioned embodiment can be modified and implemented as appropriate without departing from the scope of the present invention.

REFERENCE SIGNS LIST 1 austenitic stainless steel weld joint
10 base material
20 weld metal
30 restraint plate

The invention claimed is:

1. An austenitic stainless steel weld joint comprising a base material and a weld metal, wherein
a chemical composition of the base material consists of, in mass %:
C: 0.030% or less;
Si: 0.10 to 1.00%;
Mn: 0.20 to 2.00%;
P: 0.040% or less;
S: 0.010% or less;
Cr: 16.0 to 25.0%;
Ni: 10.0 to 30.0%;
Mo: 1.00 to 5.00%;
Nb: 0.20 to 1.00%;
N: 0.050 to 0.300%;
sol.Al: 0.001 to 0.100%;
B: 0.0010 to 0.0080%;
Cu: 0 to 1.70%;
W: 0 to 5.0%;
Co: 0 to 1.0%;
V: 0 to 1.00%;
Ta: 0 to 0.20%;
Hf: 0 to 0.20%;
Ca: 0 to 0.010%;
Mg: 0 to 0.010%; and
rare earth metals: 0 to 0.100%,
with the balance being Fe and impurities, and
satisfying Formula (1), and
in the weld metal, at a width-center position and at a thickness-center position, a chemical composition of the weld metal consists of, in mass %:
C: 0.050% or less;
Si: 0.01 to 1.00%;
Mn: 0.01 to 3.00%;
P: 0.030% or less;
S: 0.015% or less;
Cr: 15.0 to 25.0%;
Ni: 20.0 to 70.0%;
Mo: 1.30 to 10.00%;
Nb: 0.05 to 3.00%;
N: 0.150% or less;
B: 0.0050% or less;
sol.Al: 0 to 1.000%;
Cu: 0 to 2.50%;

W: 0 to 1.0%;
Co: 0 to 15.0%;
V: 0 to 0.10%;
Ti: 0 to 0.50%;
Ta: 0 to 0.20%;
Ca: 0 to 0.010%;
Mg: 0 to 0.010%; and
rare earth metals: 0 to 0.100%,
with the balance being Fe and impurities:

$$B+0.004-0.9C+0.017Mo^2 \geq 0 \quad (1)$$

where symbols of elements in Formula (1) are to be substituted by contents of corresponding elements (in mass %).

2. The austenitic stainless steel weld joint according to claim 1, wherein
the chemical composition of the base material contains one or more elements selected from the group consisting of:
Cu: 0.10 to 1.70%;
W: 0.1 to 5.0%;
Co: 0.1 to 1.0%;
V: 0.10 to 1.00%;
Ta: 0.01 to 0.20%;
Hf: 0.01 to 0.20%;
Ca: 0.001 to 0.010%;
Mg: 0.001 to 0.010%; and
rare earth metals: 0.001 to 0.100%.

3. The austenitic stainless steel weld joint according to claim 2, wherein
the chemical composition of the weld metal satisfies Formula (2):

$$0.012Cr-0.005Ni+0.013Mo+0.023Nb+0.02Al-0.004Co \leq 0.176 \quad (2)$$

where symbols of elements in Formula (2) are to be substituted by contents of corresponding elements (mass %).

4. The austenitic stainless steel weld joint according to claim 2, wherein
the chemical composition of the weld metal contains one or more elements selected from the group consisting of:
sol.Al: 0.001 to 1.000%;
Cu: 0.01 to 2.50%;
W: 0.1 to 1.0%;
Co: 0.1 to 15.0%;
V: 0.01 to 0.10%;
Ti: 0.01 to 0.50%;
Ta: 0.01 to 0.20%;
Ca: 0.001 to 0.010%;
Mg: 0.001 to 0.010%; and
rare earth metals: 0.001 to 0.100%.

5. The austenitic stainless steel weld joint according to claim 4, wherein
the chemical composition of the weld metal satisfies Formula (2):

$$0.012Cr-0.005Ni+0.013Mo+0.023Nb+0.02Al-0.004Co \leq 0.176 \quad (2)$$

where symbols of elements in Formula (2) are to be substituted by contents of corresponding elements (mass %).

6. The austenitic stainless steel weld joint according to claim 1, wherein
the chemical composition of the weld metal contains one or more elements selected from the group consisting of:
sol.Al: 0.001 to 1.000%;
Cu: 0.01 to 2.50%;
W: 0.1 to 1.0%;
Co: 0.1 to 15.0%;
V: 0.01 to 0.10%;
Ti: 0.01 to 0.50%;
Ta: 0.01 to 0.20%;
Ca: 0.001 to 0.010%;
Mg: 0.001 to 0.010%; and
rare earth metals: 0.001 to 0.100%.

7. The austenitic stainless steel weld joint according to claim 6, wherein
the chemical composition of the weld metal satisfies Formula (2):

$$0.012Cr-0.005Ni+0.013Mo+0.023Nb+0.02Al-0.004Co \leq 0.176 \quad (2)$$

where symbols of elements in Formula (2) are to be substituted by contents of corresponding elements (mass %).

8. The austenitic stainless steel weld joint according to claim 1, wherein
the chemical composition of the weld metal satisfies Formula (2):

$$0.012Cr-0.005Ni+0.013Mo+0.023Nb+0.02Al-0.004Co \leq 0.176 \quad (2)$$

where symbols of elements in Formula (2) are to be substituted by contents of corresponding elements (mass %).

* * * * *